US012444592B2

(12) United States Patent
Ouyang et al.

(10) Patent No.: US 12,444,592 B2
(45) Date of Patent: Oct. 14, 2025

(54) SAMPLE QUANTITATION USING A MINIATURE MASS SPECTROMETER

(71) Applicant: Purdue Research Foundation, West Lafayette, IN (US)

(72) Inventors: Zheng Ouyang, West Lafayette, IN (US); Linfan Li, West Lafayette, IN (US); Xiaoyu Zhou, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 2 days.

(21) Appl. No.: 17/153,156

(22) Filed: Jan. 20, 2021

(65) Prior Publication Data

US 2021/0166927 A1 Jun. 3, 2021

Related U.S. Application Data

(63) Continuation of application No. 14/909,269, filed as application No. PCT/US2014/049853 on Aug. 6, 2014, now Pat. No. 10,930,481.

(Continued)

(51) Int. Cl.

*H01J 49/00* (2006.01)
*H01J 49/04* (2006.01)
*H01J 49/42* (2006.01)

(52) U.S. Cl.

CPC ...... *H01J 49/0031* (2013.01); *H01J 49/0013* (2013.01); *H01J 49/004* (2013.01); *H01J 49/0422* (2013.01); *H01J 49/4225* (2013.01)

(58) Field of Classification Search

CPC .. H01J 49/0031; H01J 49/0013; H01J 49/004; H01J 49/0422; H01J 49/04225

See application file for complete search history.

(56) References Cited

U.S. PATENT DOCUMENTS 5,696,376 A * 12/1997 Doroshenko ......... H01J 49/424 250/282
6,177,668 B1 1/2001 Hager
(Continued)

FOREIGN PATENT DOCUMENTS

CN 101320016 A * 12/2008 ............ H01J 49/004
CN 102290319 A 12/2011
(Continued)

OTHER PUBLICATIONS

Doroshenko et al., "Advanced stored waveform inverse fourier transform technique for a matrix-assisted laser desorption/ionization quadrupole ion trap mass spectrometer", Rapid Communications in mass spectrometry, vol. 10, 65-733 (1996) (Year: 1996).*

(Continued)

*Primary Examiner* — Michael J Logie

(74) *Attorney, Agent, or Firm* — Brown Rudnick LLP; Adam M. Schoen

(57) ABSTRACT

The invention generally relates to sample analysis with a miniature mass spectrometer. In certain embodiments, the invention provides methods that involve generating ions of a first analyte and ions of a second analyte. Those ions are transferred through a discontinuous sample introduction interface into a first ion trap of a mass spectrometer in a manner in which the discontinuous sample introduction interface remains open during the transferring. The discontinuous sample introduction interface is closed and the ions are sequentially transferred to a second ion trap of the mass spectrometer where they are sequentially analyzed.

6 Claims, 36 Drawing Sheets

Related U.S. Application Data

(60) Provisional application No. 62/013,005, filed on Jun. 17, 2014, provisional application No. 61/865,377, filed on Aug. 13, 2013.

(56) References Cited

U.S. PATENT DOCUMENTS

| | | | | |
|---|---|---|---|---|
| 6,838,666 | B2 | 1/2005 | Ouyang et al. | |
| 7,335,897 | B2 | 2/2008 | Takats et al. | |
| 8,304,718 | B2 | 11/2012 | Ouyang et al. | |
| 8,785,846 | B2 | 7/2014 | Ouyang et al. | |
| 2004/0065824 | A1* | 4/2004 | Bateman | H01J 49/004 250/288 |
| 2004/0135080 | A1* | 7/2004 | Ouyang | H01J 49/422 250/282 |
| 2006/0054808 | A1* | 3/2006 | Schwartz | H01J 49/42 250/288 |
| 2006/0219896 | A1* | 10/2006 | Hashimoto | H01J 49/0027 250/288 |
| 2006/0289737 | A1 | 12/2006 | Bassmann et al. | |
| 2006/0289743 | A1* | 12/2006 | Hasegawa | H01J 49/4225 250/288 |
| 2008/0142705 | A1 | 6/2008 | Schwartz et al. | |
| 2009/0102766 | A1 | 4/2009 | Oke et al. | |
| 2009/0261247 | A1* | 10/2009 | Cooks | H01J 49/422 250/290 |
| 2009/0294661 | A1* | 12/2009 | Hashimoto | H01J 49/4295 250/290 |
| 2010/0301209 | A1* | 12/2010 | Ouyang | H01J 49/165 250/288 |
| 2011/0253891 | A1* | 10/2011 | Hashimoto | H01J 49/0422 250/288 |
| 2012/0119079 | A1* | 5/2012 | Ouyang | G01N 33/6848 250/288 |
| 2012/0223223 | A1* | 9/2012 | Sugiyama | H01J 49/0422 250/288 |
| 2013/0105683 | A1 | 5/2013 | Ouyang et al. | |
| 2013/0146759 | A1 | 6/2013 | Ouyang et al. | |
| 2014/0138540 | A1 | 5/2014 | Ouyang et al. | |
| 2014/0183350 | A1* | 7/2014 | Brown | H01J 49/10 250/288 |

FOREIGN PATENT DOCUMENTS

| | | | |
|---|---|---|---|
| JP | 2010514103 | A | 4/2010 |
| JP | 2011023184 | A | 2/2011 |
| JP | 2012184975 | A | 9/2012 |
| JP | 2012-525687 | A | 10/2012 |
| WO | 2009/023361 | A2 | 2/2009 |
| WO | 2009/102766 | A1 | 8/2009 |
| WO | 2010/127059 | A1 | 11/2010 |
| WO | 2012/058632 | A1 | 5/2012 |
| WO | 2012/162036 | A1 | 11/2012 |

OTHER PUBLICATIONS

Carroll, 1975, Atmospheric Pressure Ionization Mass Spectrometry: Corona Discharge Ion Source for Use in Liquid Chromatograph-Mass Spectrometer-Computer Analytical System, Anal. Chem. 47:2369-2373.

Cody, 2005, Versatile New Ion Source for the Analysis of Materials in Open Air under Ambient Conditions, Anal. Chem., 77:2297-2302.

Cooks, 1983, Mass spectrometry: analytical capabilities and potentials, Science, 222:273-291.

Cooks, 2006, Ambient Mass Spectrometry, Science, 311(5767): 1566-1570.

Fenn, 1989, Electrospray Ionization for Mass Spectrometry of Large Biomolecules, Science 246:64-71.

First Office Action issued Mar. 16, 2017 in Japanese Application No. 2016-534607.

First Office Action issued Mar. 29, 2017 in Chinese Application No. 201480056536.3.

Gao, 2006, Handheld Rectilinear Ion Trap Mass Spectrometer, Anal Chem, 78(17):5994-6002.

Gao, 2008, Design and Characterization of a Multisource Hand-Held Tandem Mass Spectrometer, Z. Anal. Chem, 80:7198-7205.

Gao, 2008, Breaking the pumping speed barrier in mass spectrometry: discontinuous atmospheric pressure interface, Anal. Chem, 80:4026-4032.

Gao, 2009, Characterization of a discontinuous atmospheric pressure interface. Multiple ion introduction pulses for improved performance, International Journal of Mass Spectrometry, 283(1-3):30-34.

Guna, 2011, Tandem Ion Trap Design with Enhanced Mass Analysis Capabilities for Large Populations of Ions, Anal Chem, 83:6363-6367.

Hager, 2002, A new linear ion trap mass spectrometer, Rapid Communications in Mass Spectrometry, 16(6):512-526.

Hendricks, 2014, Autonomous in-situ analysis and real-time chemical detection using a backpack miniature mass spectrometer: concept, instrumentation development and performance, Anal. Chem., 86:2900-2908.

International Search Report and Written Opinion mailed on Nov. 19, 2014, for International Patent Application No. PCT/US2014/049853, filed Aug. 6, 2014 (14 pages).

Kogelschatz, 2003, Dielectric-barrier Discharges: Their History, Discharge Physics, and Industrial Applications, Plasma Chem. and Plasma Processing, 23:1-46.

Laiko, 2000, Atmospheric Pressure Matrix-Assisted Laser Desoprtion/Ionization Mass Spectrometry, Analytical Chemistry, 72:652-657.

Li, 2014, Mini 12, Miniature Mass Spectrometer for Clinical and Other Applications—Introduction and Characterization, 86(6):2909-2916.

Monge, 2013, Mass spectrometry: recent advances in direct open air surface sampling/ionization, Chemical Reviews, 113:2269-2308.

Ouyang, 2004, Rectilinear Ion Trap: Concepts, Calculations, and Analytical Performance of a New Mass Analyzer, Analytical Chemistry, 76:4595-4605.

Ouyang, 2009, Miniature Mass Spectrometers, Annual Review of Analytical Chemistry, 2:187-214.

Ren, 2013, Analysis of Biological Samples Using Paper Spray Mass Spectrometry: An Invesitgation of Impacts by the Substrates, Solvents and Elution Methods, Chromatographia, 76:1339-1346.

Schwartz, 2002, A two-dimensional quadrupole ion trap mass spectrometer, Mass Spectrometry, 13(6):659-669.

Shiea, 2005, Electrospray-assisted laser desorption/ionization mass spectrometry for direct ambient analysis of solids, J. Rapid Comm in Mass Spectrometry, 19:3701-3704.

Sleno, 2004, Ion activation methods for tandem mass spectrometry, Journal of Mass Spectrometry, 39(10):1091-1112.

Supplemental Search Report mailed on May 24, 2017, for EP Application No. 148363518.

Takats, 2004, Mass Spectrometry Sampling Under Ambient Conditions with Desoprtion Electrospray Ionization, Science 306:471-473.

Tanaka, 1988, Protein and polymer analyses up to m/z 100 000 by laser ionization time-of-flight mass spectrometry, Rapid Commun. Mass Spectrom., 2:151-153.

Wang, 2010, Paper Spray for Direct Analysis of Complex Mixtures Using Mass Spectrometry, Angew. Chem, 49:877-880.

Watson, 2007, Mass Spectrometry—Chapter 3 In: Introduction to Mass Spectrometry—Instrumentation, Applications, and Strategies for Data Interpretation—Fourth Edition, Wiley, Jan. 1, 2007, 58 pages.

Xu, 2010, Study of Discontinuous Atmospheric Pressure Interfaces for Mass Spectrometry Instrumentation Development, Analytical Chemistry, 82(15):6584-6592.

Yamashita, 1984, Electrospray Ion Source. Another Variation on the Free-Jet Theme, J. Phys. Chem., 88:4451-4459.

* cited by examiner

PRIOR ART

PRIOR ART

SAMPLE QUANTITATION USING A MINIATURE MASS SPECTROMETER

RELATED APPLICATIONS

The present application is a continuation of U.S. nonprovisional application Ser. No. 14/909,269, filed Feb. 1, 2016, which is a 35 U.S.C. § 371 national phase application of PCT/US2014/049853, filed Aug. 6, 2014, which claims the benefit of and priority to U.S. provisional application Ser. No. 62/013,005, filed Jun. 17, 2014, and 61/865,377, filed Aug. 13, 2013, the content of each of which is incorporated by reference herein in its entirety.

GOVERNMENT SUPPORT

This invention was made with government support under GM106016 awarded by the National Institutes of Health. The government has certain rights in the invention.

FIELD OF THE INVENTION

The invention generally relates to sample quantitation with a miniature mass spectrometer.

BACKGROUND

In commercial HPLC-MS systems, a triple quadrupole mass spectrometer is typically used to measure the relative intensities of the characteristic fragment peaks of an analyte and its internal standard for quantitation (MRM, multi-reaction monitoring). However, triple quadrupole mass spectrometers are large bench-top instruments that are not suitable for point-of-care diagnostics, requiring a significant amount of laboratory space. Additionally, such systems require a high level of expertise to operate.

A miniature mass spectrometer overcomes those problems of a standard bench-top triple quadrupole mass spectrometer, enabling point-of-care diagnostics. An exemplary miniature mass spectrometer is described in Gao et al. (Anal Chem, 2006, 78, 5994-6002), Gao et al. (Anal Chem, 2008, 80, 7198-7205), and Li et al. (Anal. Chem. 2014, 86 (6), pp 2909-2916), the content of each of which is incorporated by reference herein in its entirety. To miniaturize the pumping systems, miniature mass spectrometers are equipped with a discontinuous sample introduction interface, which is an interface that periodically shuts-off an ion trap of the miniature mass spectrometer from an external environment, typically at atmospheric or slightly reduced pressures. A discontinuous sample introduction interface is described in Ouyang et al. (U.S. Pat. No. 8,304,718), the content of each of which is incorporated by reference herein in its entirety. A discontinuous sample introduction interface allows the pumps of the system to decrease the vacuum pressure within the ion trap to a suitable level after ion introduction for performing mass analysis of ions. Such a system configuration allows a miniature mass spectrometer to retain MS/MS capabilities and allows the analysis of sprayed ions with miniature pumping systems of capacity 100 times smaller than those in the commercial systems. For each scan, the discontinuous sample introduction interface is open for about 15 ms and air with ions is introduced into the vacuum. The pressure in the manifold increases (to −500 mTorr) but the ions can still be efficiently trapped in the ion trap. After the discontinuous sample introduction interface is closed, the manifold pressure decreases over a time of about 500 ms and MS or MS/MS analysis is then performed at about or below 3 mTorr.

Good sensitivity is achieved with the small pumping systems at a cost of scan speed, which is 1-2 s/scan for a miniature mass spectrometer versus 100 ms/scan for a commercial triple quadrupole mass spectrometer. That does not have a significant impact for a point-of-care system, for which an overall analysis time of 30 seconds is acceptable. However, it potentially leads to a high imprecision in quantitation. With a commercial bench-top instrument, the measurements of the analyte and internal standard intensities are executed with a time difference of 100 ms. Though the absolute intensities can drift dramatically over time, the ratios of the analyte to internal standard are obtained with relatively small variations. For a miniature mass spectrometer that is equipped with a discontinuous sample introduction interface, the measurements of analyte and internal standard intensities are performed with a minimum time difference of one second, which causes imprecision in quantitation.

SUMMARY

The invention provides a miniature mass spectrometer equipped with a discontinuous sample introduction interface that is configured to achieve the same duty cycle (i.e., 100 ms/scan) as a commercial triple quadrupole mass spectrometer. In that manner, the benefits of a miniature mass spectrometer are achieved without sacrificing duty cycle as compared to a commercial triple quadrupole mass spectrometer, and accurate analyte quantitation is achieved.

Aspects of the invention are accomplished using at least two ion traps. Ions of an analyte and an internal standard are generated and simultaneously transferred through a discontinuous sample introduction interface and into a first ion trap of the miniature mass spectrometer. The first ion trap is used to simultaneously trap the analyte and internal standard ions and sequentially send them to a second ion trap for MS/MS measurements within one scan cycle. With such a set-up, fragment intensities can be measured using two scans of the second ion trap within 100 ms and importantly, the ions of the analyte and internal standard involved in the measurements are generated at the same time under the same ionization conditions and simultaneously transferred through the discontinuous sample introduction interface and trapped in the first ion trap. That set-up results in a significant improvement in quantitative accuracy.

In certain aspects, the invention provides methods for analyzing a plurality of analytes. Those methods involve generating ions of a first analyte and ions of a second analyte. The analytes can originate from samples that are in any form, such as, solids, liquids, gases, or combinations thereof. Those ions are transferred through a discontinuous sample introduction interface into a first ion trap of a mass spectrometer. In certain embodiments, the discontinuous sample introduction interface remains open during the transferring, while in other embodiments, the discontinuous sample introduction interface cycles between opening and closing during the ion transfer process. The discontinuous sample introduction interface is closed and the ions are sequentially transferred to a second ion trap of the mass spectrometer where they are sequentially analyzed. Sequential transfer may be based on mass selectively, i.e., mass selectively transfer. The order of the transfer is not necessarily based on m/z. Any of the ions in a mixture can be mass selectively transferred at any time for MS/MS into the second ion trap. In certain embodiments, transferring the ions of the first and second analytes through the discontinuous sample introduction interface into a first ion trap occurs simultaneously. The first and second analytes may be any analytes, and in exemplary embodiments, the analytes are a sample and an internal standard. In certain embodiments, the first and second ions are transferred to the second ion trap within a single scan cycle. In certain embodiments, analyzing includes taking MS/MS measurements. In certain embodiments, the ions are fragmented in the second ion trap and the fragment ions are subsequently mass analyzed. In certain embodiments, the fragmentation occurs during the ion transfer from the first ion trap to the second ion trap and the fragment ions are mass analyzed in the second ion trap.

The methods are not limited to using any particular ion traps or combinations of ion traps. In certain embodiments, the first ion trap is a linear quadrupole ion trap and the second ion trap is a rectilinear ion trap (RIT). In other embodiments, the first and second ion traps are both rectilinear ion traps. In certain embodiments, the traps are arranged such that ions from the trap are axially ejected from the first trap into the second trap. Ions may then be axially or radially ejected from the second trap to an ion detector.

Any technique known in the art may be used to generate the ions. Exemplary ion generation techniques that utilize ionization sources at atmospheric pressure include electrospray ionization (ESI; Fenn et al., Science, 246:64-71, 1989; and Yamashita et al., J. Phys. Chem., 88:4451-4459, 1984); atmospheric pressure ionization (APCI; Carroll et al., Anal. Chem. 47:2369-2373, 1975); and atmospheric pressure matrix assisted laser desorption ionization (AP-MALDI; Laiko et al. Anal. Chem., 72:652-657, 2000; and Tanaka et al. Rapid Commun. Mass Spectrom., 2:151-153, 1988). The content of each of these references is incorporated by reference herein in its entirety.

Exemplary ion generation techniques that utilize direct ambient ionization/sampling methods (i.e., methods that do not require work-up on the sample prior to ionization) including paper spray (Ouyang et al., U.S. patent application publication number 2012/0119079; and Wang et al. Angewandte Chemie International Edition, 49, 877-880, 2010); desorption electrospray ionization (DESI; Takats et al., Science, 306:471-473, 2004 and U.S. Pat. No. 7,335,897); direct analysis in real time (DART; Cody et al., Anal. Chem., 77:2297-2302, 2005); Atmospheric Pressure or Low Pressure Dielectric Barrier Discharge Ionization (DBDI; Kogelschatz, Plasma Chemistry and Plasma Processing, 23:1-46, 2003, and PCT international publication number WO 2009/102766), electrospray-assisted laser desoption/ionization (ELDI; Shiea et al., J. Rapid Communications in Mass Spectrometry, 19:3701-3704, 2005), and ionization using wetted porous material (PCT international application number PCT/US10/32881 and Wang et al., Angew. Chem. Int. Ed. 2010, 49, 877). The content of each of these references is incorporated by reference herein in its entirety.

While methods of the invention are discussed mostly in the context of miniature mass spectrometers, methods of the invention are not limited to miniature mass spectrometers and can be used with commercial bench-top mass spectrometers. Similarly, methods of the invention do not require the use of a discontinuous sample introduction interface.

In another aspect, the invention provides methods that involve analyzing a sample and an internal standard in a miniature mass spectrometer. Those methods involve generating sample ions and internal standard ions; simultaneously transferring the sample and internal standard ions through a discontinuous sample introduction interface into a first ion trap of a miniature mass spectrometer; closing the discontinuous sample introduction interface; sequentially transferring the sample and internal standard ions to a second ion trap of the miniature mass spectrometer; and sequentially analyzing the sample and internal standard ions in the second ion trap.

Another aspect of the invention provides methods for quantifying an analyte within a miniature mass spectrometer equipped with a discontinuous sample introduction interface. Those methods involve transferring ions from an analyte and ions from an internal standard through a discontinuous sample introduction interface into a miniature mass spectrometer; analyzing the analyte and internal standard ions, in which the analyte and internal standard ions are analyzed within less than one second of each other; and quantifying the analyte. The analytes can originate from samples that are in any form, such as, solids, liquids, gases, or combinations thereof. In certain embodiments, quantifying includes obtaining a ratio of the analyte to the internal standard.

Another aspect of the invention provides methods for analyzing a plurality of analytes that involve transferring a first analyte and a second analyte through a discontinuous sample introduction interface, closing the discontinuous sample introduction interface, generating ions of the first analyte and ions of the second analyte that are transferred into a first ion trap of a mass spectrometer, sequentially transferring the ions of the first and second analytes to a second ion trap of the mass spectrometer, and sequentially analyzing the ions of the first and second analytes in the second ion trap. In such embodiments, the ionizing source is after the discontinuous sample introduction interface. Such a system set-up is described, for example in Ouyang et al. (U.S. Pat. No. 8,785,846 and U.S. patent application publication number 2014/0138540), the content of each if which is incorporated by reference herein in its entirety. In certain embodiments, the first and second analytes are contained in a vessel that is operably associated with the discontinuous sample introduction interface. The vessel may be maintained at atmospheric pressure or below atmospheric pressure. In certain embodiments, the vessel is maintained at a pressure below atmospheric pressure. Any of the above described ionization techniques may be used in the generating step. In certain embodiments, the generating step utilizes a dielectric bather discharge ionization source. In certain embodiments, the mass spectrometer is a miniature mass spectrometer.

BRIEF DESCRIPTION OF THE DRAWINGS

FIG. 35C (bottom panel) shows that with a balanced double phase RF applied between the x and y electrode pairs, the center potential is lower but could still be up to 57 V. For the QLIT (FIG. 35D) with symmetric configuration, the center potential could still be high with the single phase RF (FIG. 35E, left panel) but stays as 0 V when a balanced double phase RF is applied (FIG. 35E, right panel).

FIG. 37, panel A shows that all the ions could be transferred to RIT without mass selection by lowering the potential on the common mesh electrode to −2.3 V. MS spectrum was recorded with a subsequent MS analysis using RIT with the radial ejection. FIG. 37, panels B-E show that while all the ions were trapped in the QLIT, the precursor ions in each narrow m/z range could be mass selectively transferred to RIT. When a difference between the DC offsets of QLIT and RIT was smaller than 10 V, no significant fragmentation would occur. A subsequent MS analysis could generate MS spectra of the precursor ions as shown in FIG. 37, panels B-F. MS/MS analysis could also be performed to each of these ions in RIT, with the results shown in FIG. 36 panels A-F.

DETAILED DESCRIPTION

Figure 1A:
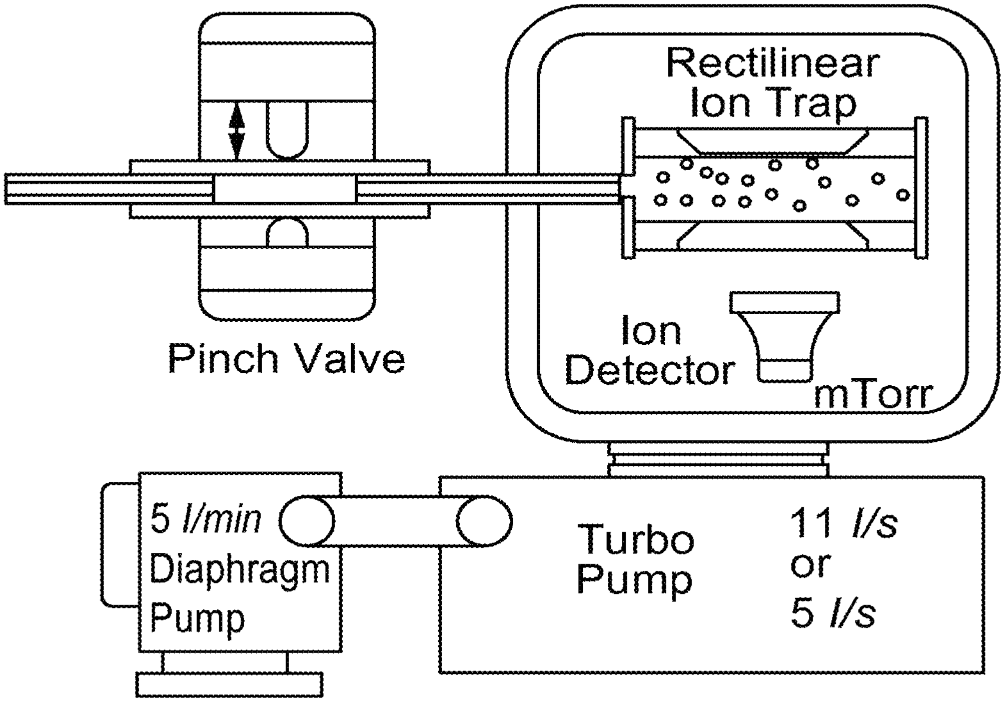
FIG. 1A PRIOR ART
FIG. 1A is a schematic of a prior art system configuration and operation mode for a miniature mass spectrometer.

Tandem mass spectrometry (MS/MS) is an essential tool in chemical analysis, due to its capability of elucidating chemical structures, suppressing chemical noises, and quantitation at high precisions. The MS/MS analysis has been typically applied by isolating target precursor ions, while wasting other ions, followed by a fragmentation that produces product ions. In the Examples below, configurations of dual linear ion traps were explored to develop high efficiency MS/MS analysis. The ions trapped in the first linear ion trap were axially, mass-selectively transferred to the second linear ion trap for MS/MS analysis. Ions from multiple compounds simultaneously introduced into the mass spectrometer were sequentially analyzed. This development enabled a highly efficient use of sample and also significantly improved the analysis speed and the quantitation precision for ion trap mass spectrometers with discontinuous sample introduction interfaces, especially for the miniature systems with ambient ionization sources.

The invention generally relates to sample quantitation with a miniature mass spectrometer. Exemplary miniature mass spectrometers are described, for example in Gao et al. (Anal Chem, 2006, 78, 5994-6002), Gao et al. (Anal Chem, 2008, 80, 7198-7205), Ouyang et al. ("Atmospheric Pressure Interface for Miniature Mass Spectrometers", The Pittsburgh Conference on Analytical, Chemistry and Applied Spectroscopy, Orlando, FL, US, 2012), Ouyang et al. ("Mass Spectrometry for Human Health and Security", The Pittsburgh Conference on Analytical, Chemistry and Applied Spectroscopy, Orlando, FL, US, 2012), Ouyang et al. ("Proof-of-Concept Development of a Personal Mass Spectrometer", 60th ASMS Conference on Mass Spectrometry and Allied Topics, 2012), and Li et al. (Anal. Chem. 2014 86 (6), pp 2909-2916), the content of each of which is incorporated by reference herein in its entirety. In comparison with the pumping system used for lab-scale instruments with thousands watts of power, a miniature mass spectrometer generally has a 18 W pumping system with only a 5 L/min (0.3 $m^3$/hr) diaphragm pump and a 11 L/s turbo pump.

In certain aspects, the invention provides methods for analyzing a plurality of analytes. Those methods involve generating ions of a first analyte and ions of a second analyte. The analytes can originate from samples that are in any form, such as, solids, liquids, gases, or combinations thereof. The samples can be mammalian tissue or body fluid samples (e.g., human tissue or human body fluid samples, such as blood, plasma, urine, saliva, sputum, spinal fluid, breast fluid, etc.), environmental samples, or agricultural samples (such as food samples). Those ions are transferred through a discontinuous sample introduction interface into a first ion trap of a mass spectrometer in a manner in which the discontinuous sample introduction interface remains open during the transferring. The discontinuous sample introduction interface is closed and the ions are sequentially transferred to a second ion trap of the mass spectrometer where they are sequentially analyzed.

Figure 1B:
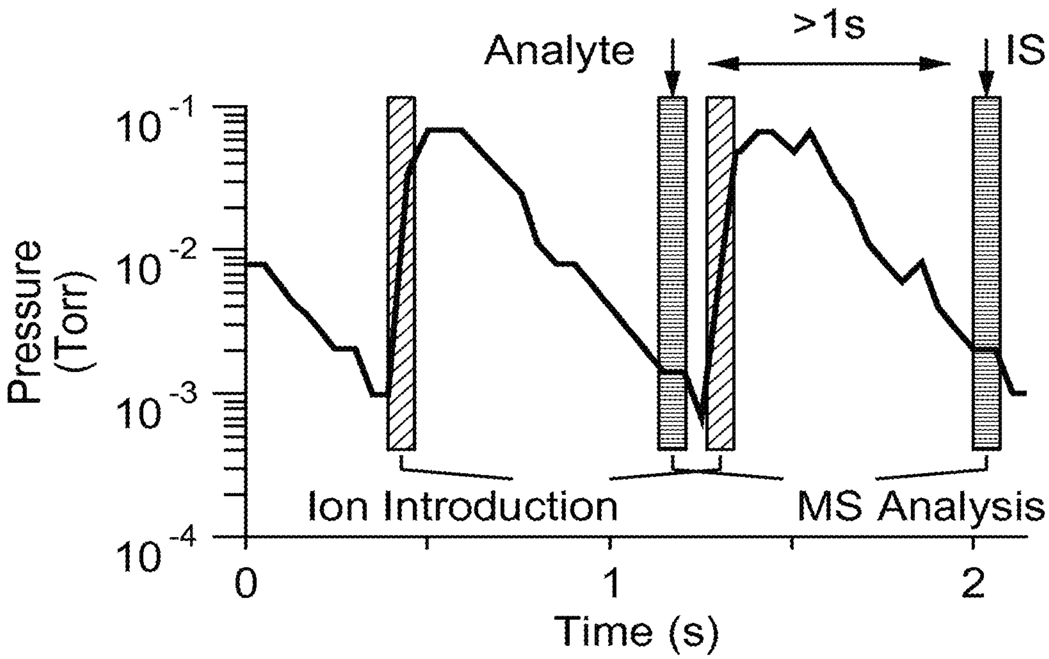
FIG. 1B is a graph illustrating that with the prior art system, after the DAPI is closed, the manifold pressure decreases over a time of about 500 ms and MS or MS/MS analysis is then performed at about or below 3 mTorr. Good sensitivity is achieved with the small pumping systems at a cost of scan speed, which is 1-2 s/scan.
Figure 1C:
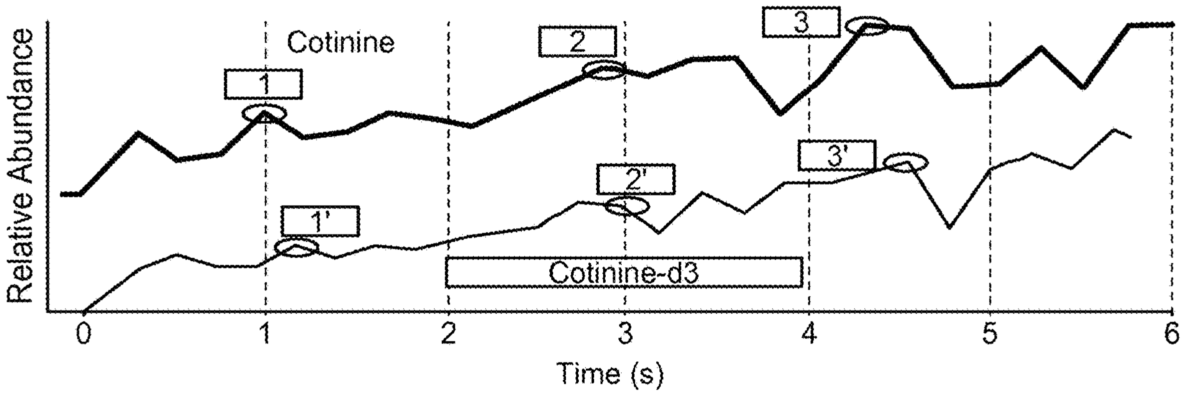
FIG. 1C is a graph from a prior art commercial triple quadrupole showing intensities measured through multiple reaction monitoring for cotinine (177/180→80) and contine-d3 (internal standard) in bovine whole blood (100 ng/mL).

A prior art set-up of a miniature mass spectrometer equipped with a discontinuous sample introduction interface is shown in FIG. 1A. Such a system retains MS/MS capabilities and allows the analysis of sprayed ions with miniature pumping systems of capacity 100 times smaller than those in the commercial systems. For each scan, the discontinuous sample introduction interface is open for about 15 ms and air with ions is introduced into the vacuum. The pressure in the manifold increases (to ~500 mTorr) but the ions can still be efficiently trapped in the ion trap (exemplified in FIG. 1A as a rectilinear ion trap (RIT)). After the discontinuous sample introduction interface is closed, the manifold pressure decreases over a time of about 500 ms and MS or MS/MS analysis is then performed at about or below 3 mTorr (FIG. 1B). Good sensitivity is achieved with the small pumping systems at a cost of scan speed, which is 1-2 s/scan for this system versus 100 ms/scan for a triple quadrupole mass spectrometer. However, it potentially leads to a high imprecision in quantitation. With a commercial instrument, the measurements of the analyte and internal standard (IS) intensities are executed with a time difference of 100 ms. Though the absolute intensities can drift dramatically over time (FIG. 1C), the ratios of the analyte and internal standard are obtained with relatively small variations. For the miniature mass spectrometer with a DAPI-RIT configuration, the measurements of analyte and internal standard intensities are performed with a minimum time difference of one second (FIG. 1B), which is a cause of the imprecision in quantitation.

Figure 2A:
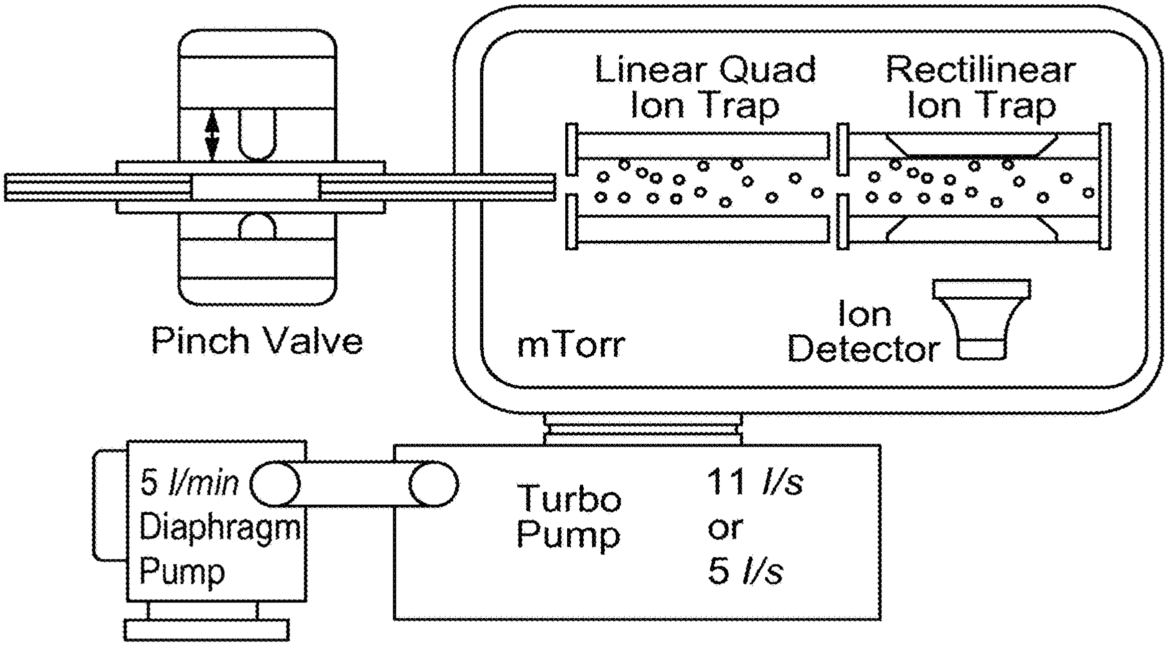
FIG. 2A is a schematic showing a system configuration for methods of the invention.
Figure 2B:
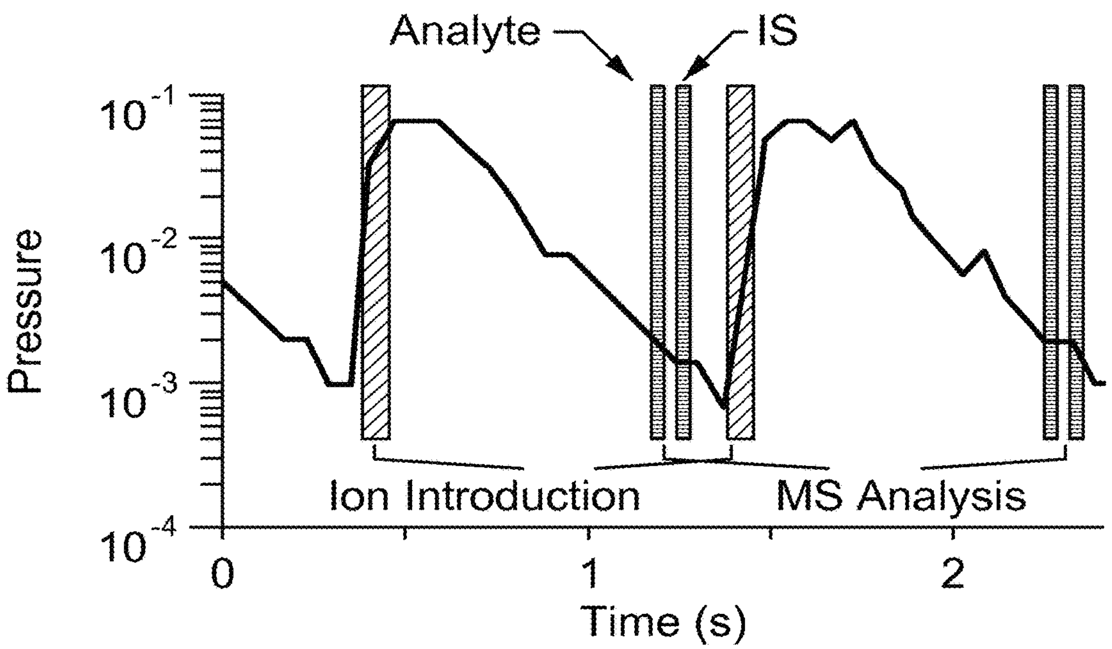
FIG. 2B is a graph illustrating that with system of the invention, after the DAPI is closed, the fragment intensities are measured using two scans of the RIT within 100 ms.

The invention solves that problem and provides a miniature mass spectrometer equipped with a discontinuous sample introduction interface that is configured to achieve the same duty cycle (i.e., 100 ms/scan) as a commercial triple quadrupole mass spectrometer. FIG. 2A illustrates an exemplary embodiment of the invention. For systems of the invention, an additional ion trap, such as a linear ion trap (LIT) of a quadrupole type, is added between the discontinuous sample introduction interface and the RIT. The LIT is able to simultaneously trap the analyte and internal standard ions and sequentially send them to the RIT for MS/MS measurements (FIG. 2B) within one scan cycle. The fragment intensities are measured using two scans of the RIT within 100 ms (FIG. 2B) and importantly, the ions of the analyte and internal standard involved in the measurements are generated at the same time under the same ionization conditions and simultaneously transferred through the discontinuous sample introduction interface and trapped in the LIT. A significant improvement can be expected in quantitative accuracy.

Figure 3A:
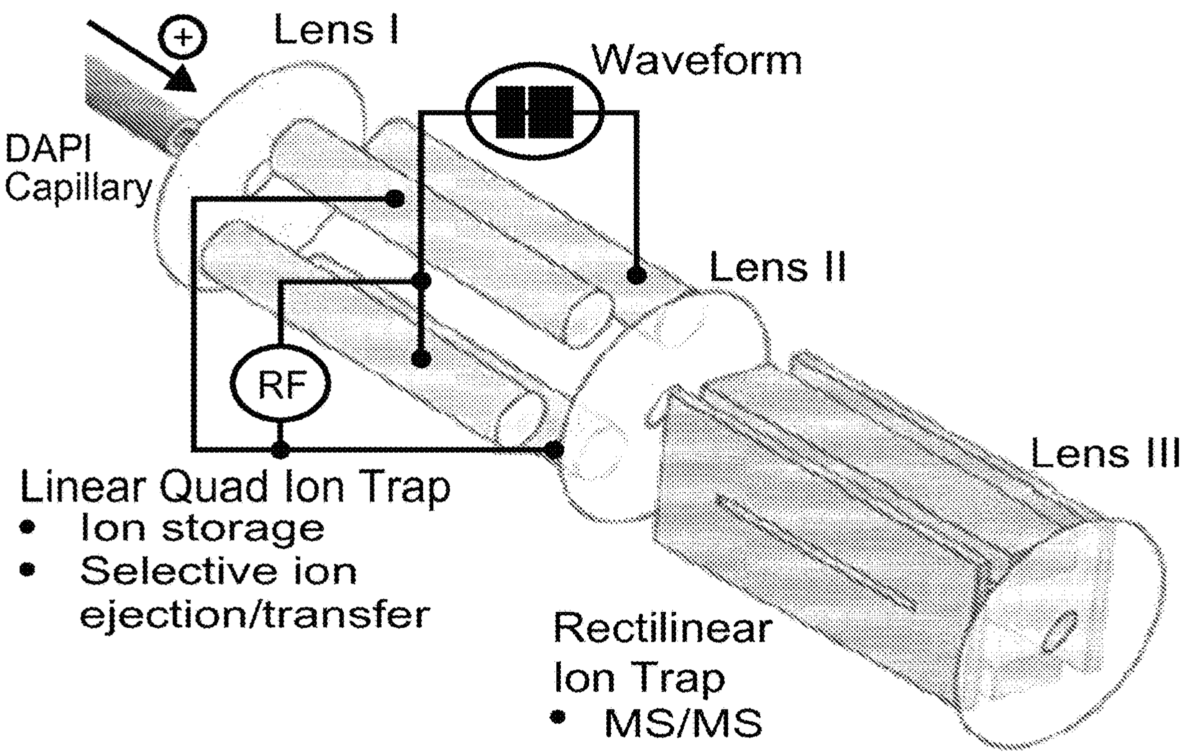
FIG. 3A is a schematic showing a configuration of an embodiment of the two ion traps for use in systems of the invention.
Figure 3B:
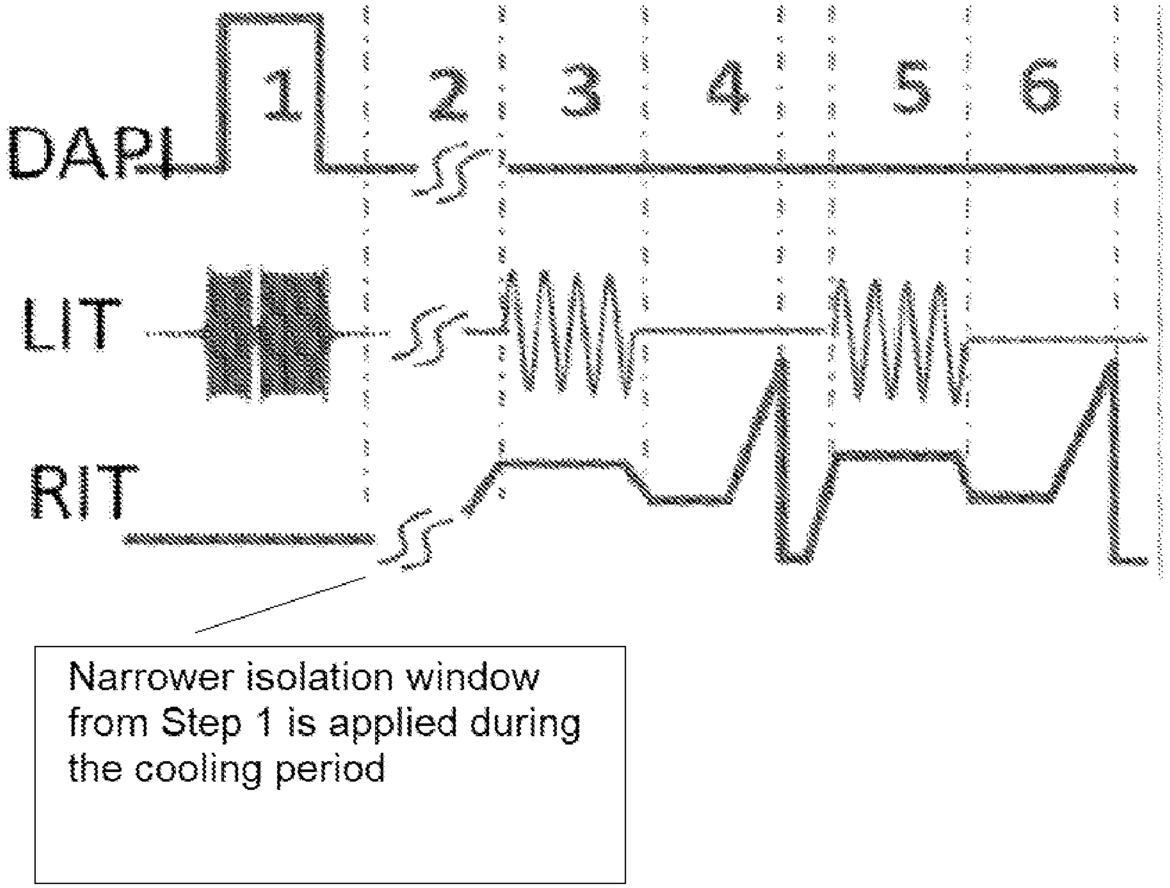
FIG. 3B is a schematic showing synchronized control signals for DAPI, LIT and RIT.

FIGS. 3A-3B show an exemplary implementation of a system configuration of the invention. A quadrupole of r0=5 mm and a length of 40 mm is used as the LIT. The mass selective transfer of the analyte and the internal standard are based on axial mass selective scan technology, which has been previously used in the SCIEX ion trap mass spectrometer, described for example in Hager (Rapid Communications in Mass Spectrometry, 2002, 16, 512-526), and Guna (Anal Chem, 2011, 83, 6363-6367), the content of each of which is incorporated by reference herein in its entirety. A series of the waveforms are applied between one pair of RF electrodes to facilitate isolation and excitation of the analyte and internal standard ions. When the discontinuous sample introduction interface is open (step 1 in FIG. 3B), a SWIFT (stored waveform inverse Fourier transform) with a wide isolation window (~Δm/z 50) centered at the m/z value of the analyte ion is applied. This helps to improve the trapping efficiency for the analyte and internal standard ions (typically with a Δm/z<10) by minimizing the space charge effects. After the discontinuous sample introduction interface is closed, another SWIFT with a narrower isolation window (~Δm/z 10-15) is applied during the cooling period (step 2) to further minimize the potential interferences from other ions during the later ion transfer step. The DC potential on Lens I (FIG. 3A) is increased to push the trapped ions toward Lens II and a resonance AC is then applied between one pair of RF electrodes of LIT (step 3) to eject the analyte ions axially from the LIT to the RIT, where they are analyzed with MS/MS (step 4). A second resonance AC with the frequency adjusted lower is then applied again (step 5) to eject the IS ions for MS/MS analysis (step 6).

While exemplified using an analyte and an internal standard, methods of the invention are not limited to those two molecules and can be performed with any analytes. Additionally, methods of the invention can be performed with more than two analytes, such as three, four, five, 10, 20, etc. Additionally, while the ion traps exemplified are a linear quadrupole type ion trap and a rectilinear ion trap, methods of the invention are not limited to those ion traps. The method are not limited to using any particular ion traps or combinations of ion traps.

Any technique known in the art may be used to generate the ions. Exemplary ion generation techniques that utilize ionization sources at atmospheric pressure include electrospray ionization (ESI; Fenn et al., Science, 246:64-71, 1989; and Yamashita et al., J. Phys. Chem., 88:4451-4459, 1984); atmospheric pressure ionization (APCI; Carroll et al., Anal. Chem. 47:2369-2373, 1975); and atmospheric pressure matrix assisted laser desorption ionization (AP-MALDI; Laiko et al. Anal. Chem., 72:652-657, 2000; and Tanaka et al. Rapid Commun. Mass Spectrom., 2:151-153, 1988). The content of each of these references in incorporated by reference herein its entirety.

Exemplary ion generation techniques that utilize direct ambient ionization/sampling methods (i.e., methods that do not require work-up on the sample prior to ionization) including paper spray (Ouyang et al., U.S. patent application publication number 2012/0119079; and Want et al. Angewandte Chemie International Edition, 2010, 49, 877-880) desorption electrospray ionization (DESI; Takats et al., Science, 306:471-473, 2004 and U.S. Pat. No. 7,335,897); direct analysis in real time (DART; Cody et al., Anal. Chem., 77:2297-2302, 2005); Atmospheric or Low Pressure Dielectric Barrier Discharge Ionization (DBDI; Kogelschatz, Plasma Chemistry and Plasma Processing, 23:1-46, 2003, and PCT international publication number WO 2009/102766), electrospray-assisted laser desoption/ionization (ELDI; Shiea et al., J. Rapid Communications in Mass Spectrometry, 19:3701-3704, 2005), and ionization using wetted porous material (U.S. patent application publication number 2012/0119079 and PCT application number PCT/US10/32881 and Wang et al., Angew. Chem. Int. Ed. 2010, 49, 877). The content of each of these references in incorporated by reference herein its entirety.

While methods of the invention are discussed mostly in the context of miniature mass spectrometers, methods of the invention are not limited to miniature mass spectrometers and can be used with commercial bench-top mass spectrometers. Similarly, methods of the invention do not require the use of a discontinuous sample introduction interface.

Discontinuous Sample Introduction Interface

In certain embodiments, devices of the invention are used with discontinuous sample introduction interface. Discontinuous sample introduction interfaces are described in Ouyang et al. (U.S. Pat. No. 8,304,718 and PCT application number PCT/US2008/065245), the content of each of which is incorporated by reference herein in its entirety.

Figure 4:
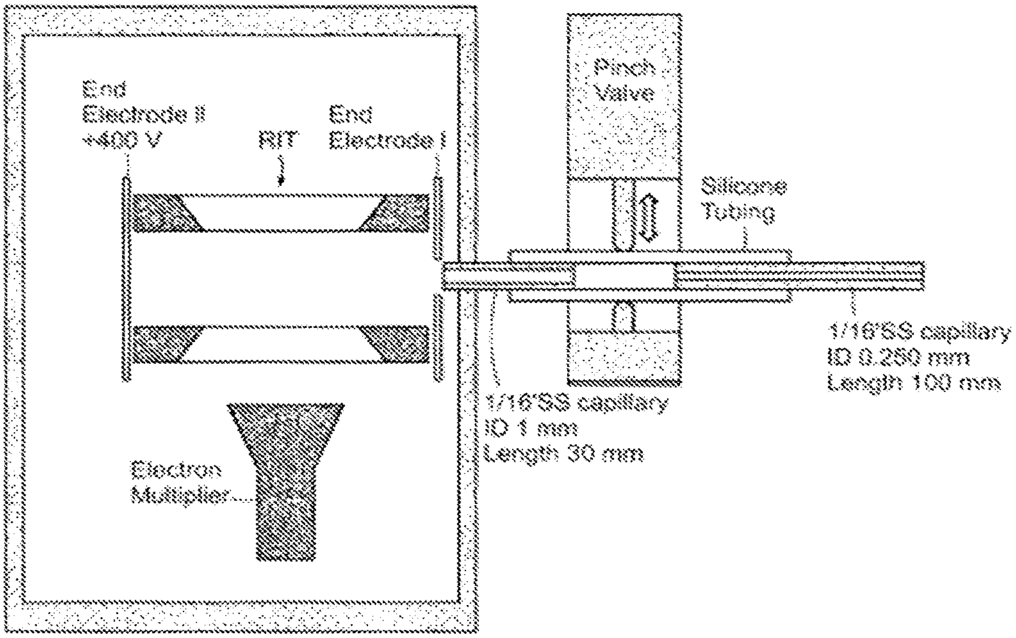
FIG. 4 is a schematic showing a discontinuous atmospheric pressure interface coupled in a miniature mass spectrometer with rectilinear ion trap.

An exemplary discontinuous sample introduction interface is shown in FIG. 4. The concept of the discontinuous sample introduction interface is to open its channel during ion introduction and then close it for subsequent mass analysis during each scan. An ion transfer channel with a much bigger flow conductance can be allowed for a discontinuous sample introduction interface than for a traditional continuous discontinuous sample introduction interface. The pressure inside the manifold temporarily increases significantly when the channel is opened for maximum ion introduction. All high voltages can be shut off and only low voltage RF is on for trapping of the ions during this period. After the ion introduction, the channel is closed and the pressure can decrease over a period of time to reach the optimal pressure for further ion manipulation or mass analysis when the high voltages can be is turned on and the RF can be scanned to high voltage for mass analysis.

A discontinuous sample introduction interface opens and shuts down the airflow in a controlled fashion. The pressure inside the vacuum manifold increases when the atmospheric pressure interface (API) opens and decreases when it closes. The combination of a discontinuous sample introduction interface with a trapping device, which can be a mass analyzer or an intermediate stage storage device, allows maximum introduction of an ion package into a system with a given pumping capacity.

Much larger openings can be used for the pressure constraining components in the API in the new discontinuous introduction mode. During the short period when the API is opened, the ion trapping device is operated in the trapping mode with a low RF voltage to store the incoming ions; at the same time the high voltages on other components, such as conversion dynode or electron multiplier, are shut off to avoid damage to those device and electronics at the higher pressures. The API can then be closed to allow the pressure inside the manifold to drop back to the optimum value for mass analysis, at which time the ions are mass analyzed in the trap or transferred to another mass analyzer within the vacuum system for mass analysis. This two-pressure mode of operation enabled by operation of the API in a discontinuous fashion maximizes ion introduction as well as optimizing conditions for the mass analysis with a given pumping capacity.

The design goal is to have largest opening while keeping the optimum vacuum pressure for the mass analyzer, which is between $10^{-3}$ to $10^{-10}$ torr depending the type of mass analyzer. The larger the opening in an atmospheric pressure interface, the higher is the ion current delivered into the vacuum system and hence to the mass analyzer.

An exemplary embodiment of a discontinuous sample introduction interface is described herein. The discontinuous sample introduction interface includes a pinch valve that is used to open and shut off a pathway in a silicone tube connecting regions at atmospheric pressure and in vacuum. A normally-closed pinch valve (390NC24330, ASCO Valve Inc., Florham Park, NJ) is used to control the opening of the vacuum manifold to atmospheric pressure region. Two stainless steel capillaries are connected to the piece of silicone plastic tubing, the open/closed status of which is controlled by the pinch valve. The stainless steel capillary connecting to the atmosphere is the flow restricting element, and has an ID of 250 μm, an OD of 1.6 mm (1/16") and a length of 10 cm. The stainless steel capillary on the vacuum side has an ID of 1.0 mm, an OD of 1.6 mm (1/16") and a length of 5.0 cm. The plastic tubing has an ID of 1/16", an OD of 1/8" and a length of 5.0 cm. Both stainless steel capillaries are grounded. The pumping system of the miniature mass spectrometer consists of a two-stage diaphragm pump 1091-N84.0-8.99 (KNF Neuberger Inc., Trenton, NJ) with pumping speed of 5 L/min (0.3 m3/hr) and a TPD011 hybrid turbomolecular pump (Pfeiffer Vacuum Inc., Nashua, NH) with a pumping speed of 11 L/s.

When the pinch valve is constantly energized and the plastic tubing is constantly open, the flow conductance is so high that the pressure in vacuum manifold is above 30 torr with the diaphragm pump operating. The ion transfer efficiency was measured to be 0.2%, which is comparable to a lab-scale mass spectrometer with a continuous API. However, under these conditions the TPD 011 turbomolecular pump cannot be turned on. When the pinch valve is de-energized, the plastic tubing is squeezed closed and the turbo pump can then be turned on to pump the manifold to its ultimate pressure in the range of $1\times10^{5}$ torr.

The sequence of operations for performing mass analysis using ion traps usually includes, but is not limited to, ion introduction, ion cooling and RF scanning. After the manifold pressure is pumped down initially, a scan function is implemented to switch between open and closed modes for ion introduction and mass analysis. During the ionization time, a 24 V DC is used to energize the pinch valve and the API is open. The potential on the rectilinear ion trap (RIT) end electrode is also set to ground during this period. A minimum response time for the pinch valve is found to be 10 ms and an ionization time between 15 ms and 30 ms is used for the characterization of the discontinuous API. A cooling time between 250 ms to 500 ms is implemented after the API is closed to allow the pressure to decrease and the ions to cool down via collisions with background air molecules. The high voltage on the electron multiplier is then turned on and the RF voltage is scanned for mass analysis. During the operation of the discontinuous API, the pressure change in the manifold can be monitored using the micro pirani vacuum gauge (MKS 925C, MKS Instruments, Inc. Wilmington, MA) on Mini 10.

Rectilinear Ion Trap

Rectilinear ion traps are described for example in Ouyang et al. (U.S. Pat. No. 6,838,666), the content of which is incorporated by reference herein in its entirety. FIGS. 5-8 illustrate four rectilinear ion trap geometries and the DC, AC and RF voltages applied to the electrode plates to trap and analyze ions as the case may be. The trapping volume is defined by x and y pairs of spaced flat or plate RF electrodes 11, 12 and 13, 14 in the zx and zy planes. Ions are trapped in the z direction by DC voltages applied to spaced flat or plate end electrodes 16, 17 in the xy plane disposed at the ends of the volume defined by the x, y pair of plates, FIGS. 5 and 6, or by DC voltages applied together with RF in sections 18, 19 each comprising pairs of flat or plate electrodes 11*a*, 12*a* and 13*a*, 13*b*, FIG. 7. In addition to the RF sections flat or plate electrodes 16, 17 can be added, FIG. 8. The DC trapping voltages are illustrated in FIGS. 5B, 6B, 7B, and 8B for each geometry. The ions are trapped in the x, y direction by the quadrupolar RF fields generated by the RF voltages applied to the plates. As will be presently described, ions can be ejected along the z axis through apertures formed in the end electrodes or along the x or y axis through apertures formed in the x or y electrodes. The ions to be analyzed or excited can be formed within the trapping volume by ionizing sample gas while it is within the volume, as for example, by electron impact ionization, or the ions can be externally ionized and injected into the ion trap. The ion trap is generally operated with the assistance of a buffer gas. Thus when ions are injected into the ion trap they lose kinetic energy by collision with the buffer gas and are trapped by the DC potential well. While the ions are trapped by the application of RF trapping voltages AC and other waveforms can be applied to the electrodes to facilitate isolation or excitation of ions in a mass selective fashion as described in more detail below. To perform an axial ejection scan the RF amplitude is scanned while an AC voltage is applied to the end plates. Axial ejection depends on the same principles that control axial ejection from a linear trap with round rod electrodes (U.S. Pat. No. 6,177,668). In order to perform an orthogonal ion ejection scan, the RF amplitude is scanned and the AC voltage is applied on the set of electrodes which include an aperture. The AC amplitude can be scanned to facilitate ejection. Circuits for applying and controlling the RF, AC and DC voltages are well known.

Figure 7A:
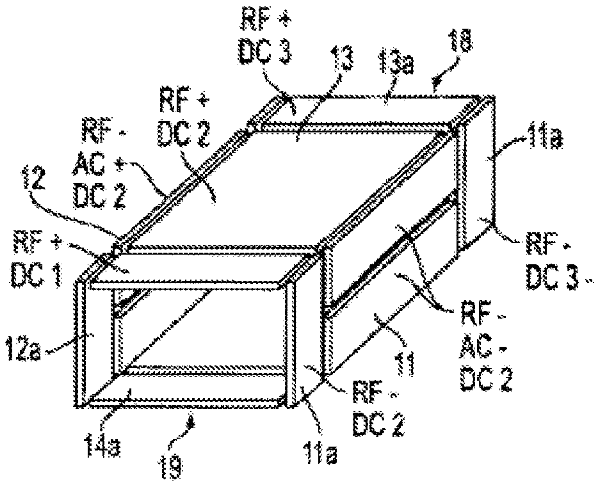
FIGS. 7A-B show a rectilinear ion trap with three RF sections and DC trapping voltages.
Figure 7B:
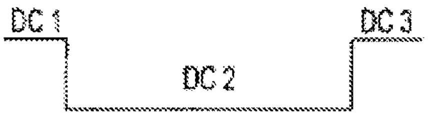
Figure 8A:
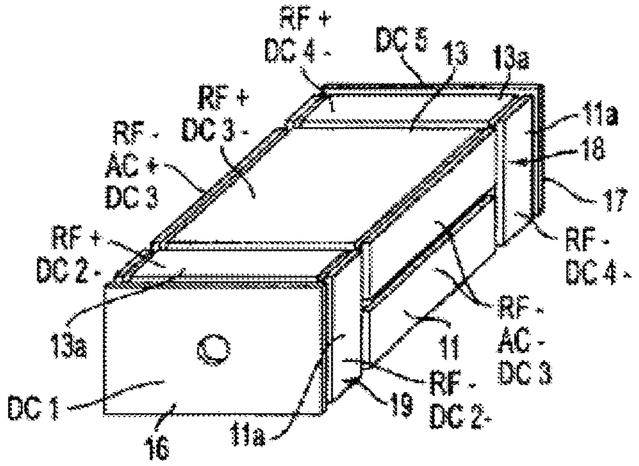
FIGS. 8A-B shows a rectilinear ion trap with three RF sections and end plates and DC trapping voltages.
Figure 8B:
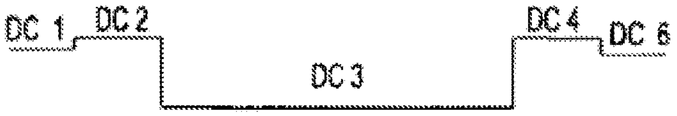

Ions trapped in the RIT can drift out of the trap along the z axis when the DC voltages are changed so as to remove the potential bathers at the end of the RIT. In the RIT configuration of FIG. 5, the distortion of the RF fields at the end of the RIT may cause undesirable effects on the trapped ions during processes such as isolation, collision induced dissociation (CID) or mass analysis. The addition of the two end RF sections 18 and 19 to the RIT as shown in FIGS. 7A and 8A will help to generate a uniform RF field for the center section. The DC voltages applied on the three sections establish the DC trapping potential and the ions are trapped in the center section, where various processes are performed on the ions in the center section. In cases where ion isolation or ion focusing is needed, end electrodes 16, 17 can be installed as shown in FIG. 8. Thus FIGS. 5-8 and other figures to be described merely indicate the applied voltages from the suitable voltage sources.

Figure 9:
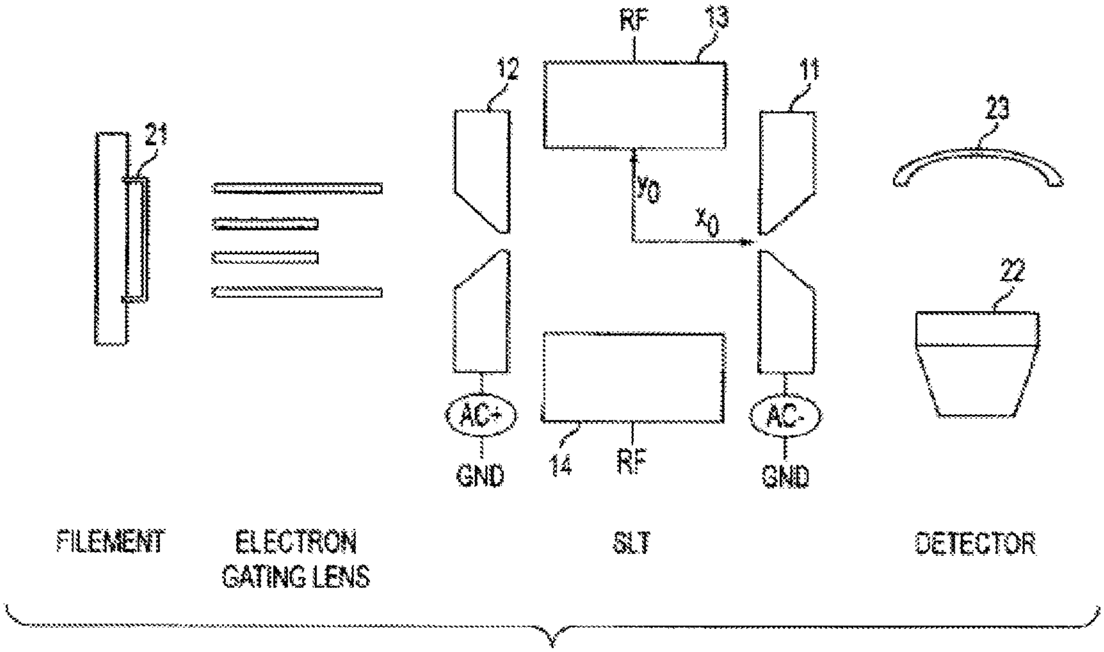
FIG. 9 schematically shows a rectilinear ion trap of the type shown in FIG. 2 in a mass analyzing system.

To demonstrate the performance of a rectilinear ion trap an analyzing system was built and tested using a rectilinear ion trap (RIT) in an ITMS system sold by Thermo Finnigan, San Jose, Calif. The RIT was of the type illustrated in FIG. 6 and the complete system is schematically shown in FIG. 9. The half-distance between the two electrodes in the x direction with the slits ($x_0$) and the two electrodes in the y direction ($y_0$) ws 5.0 mm. The distance between the x and y electrodes and the z electrode was 1.6 mm. The length of the x and y electrodes was 40 mm. The slits in the x electrodes were 15 mm long and 1 mm wide and located centrally. The RF voltage was applied at a frequency of 1.2 MHz and was applied between the y electrodes and ground. An AC dipolar field was applied between the two x electrodes 11, 12. A positive DC voltage (50 to 200 V) was applied to the z electrodes 16, 17, FIG. 6, to trap positive ions within the RIT along the z direction. Helium was added as buffer gas to an indicated pressure of $3\times10^{-5}$ torr.

Figure 10:
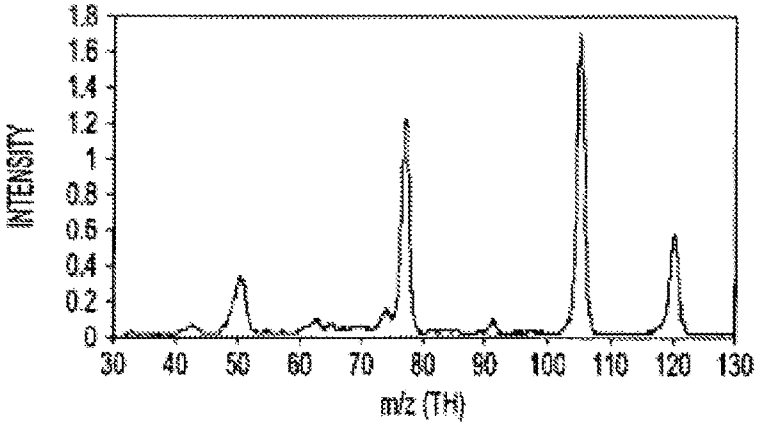
FIG. 10 shows the mass spectrum for acetophenone obtained with the system of FIG. 5.

In the experiment volatile compounds to be analyzed were leaked into the vacuum chamber to an indicated pressure of $2\times10^{-6}$ torr. The electrons emitted from the filament 21 were injected into the RIT to ionize the volatile compound and ions were formed inside the RIT through electron impact (EI) ionization. The ions were trapped by the applied RF and DC fields. After a period of cooling, the RF was ramped and the ions were ejected through the slit on the x electrode and detected by an electron multiplier 22 equipped with a conversion dynode 23. FIG. 10 shows a mass spectrum of acetophenone recorded in the experiment. The spectrum shows relatively abundant molecular and the fragment ions typically seen for this compound in other types of mass spectrometers.

Figure 11:
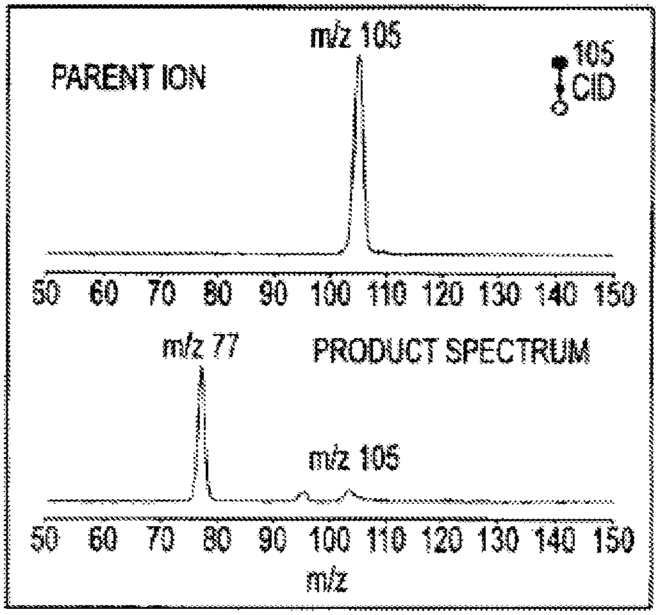
FIG. 11 shows the mass spectrum of the parent m/z 105 ion of acetophenone and the fragment ion m/z 105 obtained by CID in the system of FIG. 5.

The MS/MS capabilities of the RIT were tested as well. The fragment ion m/z 105 of acetophenone was isolated using RF/DC isolation and then excited by applying an AC field of 0.35 V amplitude and 277 kHz frequency. The isolation of the parent ion and the MS/MS product ion spectrum is shown in FIG. 11.

Figure 12:
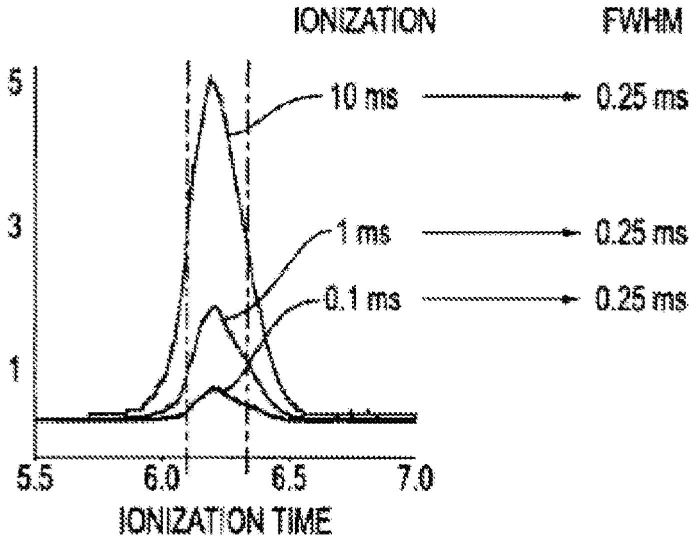
FIG. 12 shows the effects of ionization of dichlorobenzene for different times to obtain the ion of mass m/z 111.

The trapping capacity was tested using the onset of observable space charge effects ("spectral limit") as a criterion by which to estimate the number of trapped ions. When the number of ions exceeds the spectral limit for space charge, the resolution of the spectrum becomes noticeably poorer. To characterize the spectral limit of the RIT, dichlorobenzene was ionized using an ionization time of 0.1, 1 and 10 ms (0.1 is the shortest ionization time which can be set using the ITMS control electronics; when an ionization time longer than 10 ms was used, the signal intensity exceeded the limits of the detector). The trapped ions were mass analyzed in the RIT to generate the spectra. The peak shape of m/z 111 was used to compare the mass resolution for each ionization time as shown in FIG. 12. The FWHM of the peak does not change when the ionization varies 100 fold from 0.1 ms to 10 ms, which means the spectral limit (defined below) has not been reached at the limit of the dynamic range of the electron multiplier.

The relationship between the mass charge ratio of the ions that are trapped, the geometry of the RIT and the applied RF and DC voltages can be estimated by the following equations:

$$\frac{m}{e} = A_2\frac{8V_{RF}}{q_x x_0^2\Omega^2} \qquad \text{Eq. 1}$$

$$\frac{m}{e} = -A_2\frac{16U_{DC}}{a_x x_0^2\Omega^2} \qquad \text{Eq. 2}$$

where $A_2$ is the quadrupole expansion coefficient in the multipole expansion expression of the electric field, $V_{RF}$ and $U_{DC}$ are the amplitudes of the RF and DC voltages applied between the x and y electrodes, $a_x$ and $q_x$, are the Mathieu parameters, $x_0$ is the center to x electrode distance, and $\Omega$ is the frequency of the applied RF. The secular frequency $\Omega_u$ (u=x or y) can be estimated by:

$$\omega_u = \frac{1}{2}\beta_u\Omega \qquad \text{Eq. 3}$$

where $$\beta_u^2 = a_u + \cfrac{q_u}{(\beta_u+2)^2 - a_u - \cfrac{q_u^2}{(\beta_u-4)^2 - a_u - \cfrac{q_u^2}{(\beta_u-6)^2 - a_u - \dots}}} + \cfrac{q_u}{(\beta_u-2)^2 - a_u - \cfrac{q_u^2}{(\beta_u-4)^2 - a_u - \cfrac{q_u^2}{(\beta_2-6)^2 - a_u - \dots}}} \qquad \text{Eq. 4}$$

Figure 13:
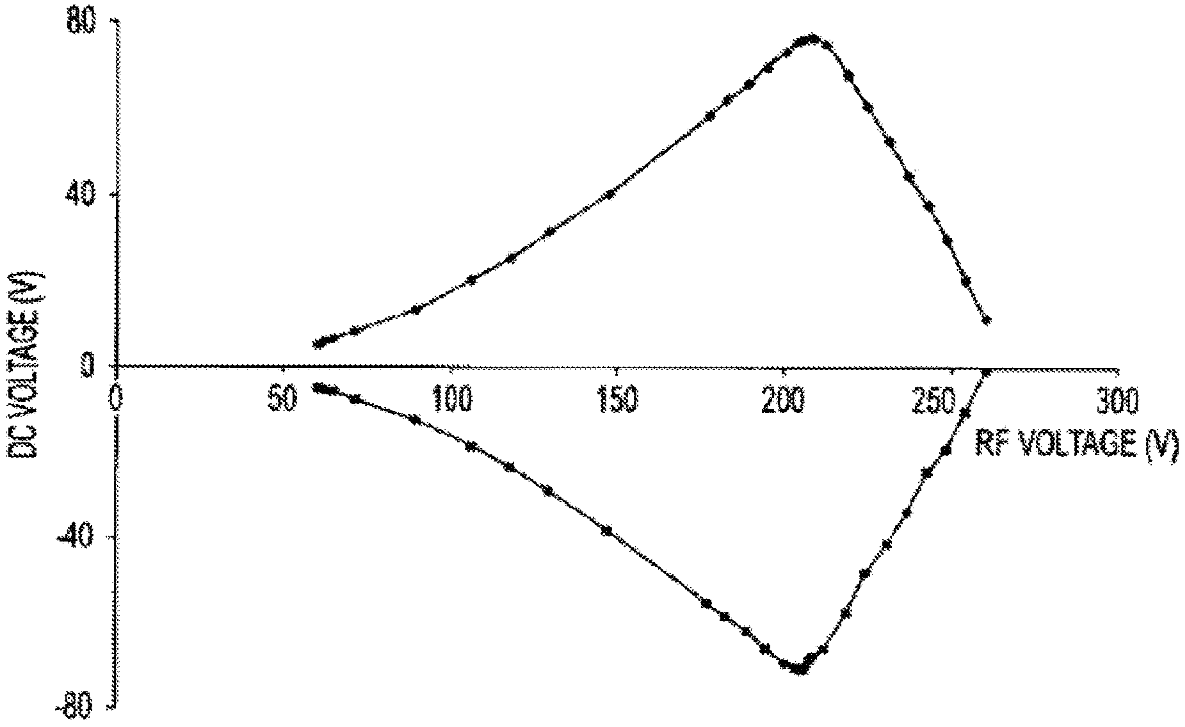
FIG. 13 shows the stability diagram mapped using RF and DC voltages for the rectilinear ion trap (defined below)

The stability diagram for the RIT is shown in FIG. 13.

As seen from the foregoing equations, by the application of RF voltage of predetermined frequency to the RF electrodes and DC voltages to the range which also depends upon the dimensions of the ion trap. The trapped ions can be isolated, ejected, mass analyzed and monitored. Ion isolation is carried out by applying RF/DC voltages to the x y electrode pairs. The RF amplitude determines the center mass of the isolation window, and the ratio of RF to the DC amplitude determines the width of the isolation window. Another method of isolating ions would be to trap ions over a broad mass range by the application of suitable RF and DC voltages and then to apply a wide band waveform containing the secular frequencies of all ions except those that are to be isolated. The wave form is applied between two opposite (typically x or y) electrodes for a predetermined period of time. The ions of interest are unaffected while all other ions are ejected. The secular frequency for any ion of any given m/z value can be determined from Equation 3 and can be changed by varying the RF amplitude. Trapped ions can be excited by applying an AC signal having a frequency equal to the secular frequency of the particular ion to be excited applied between two opposite RF electrodes. Ions with this secular frequency are excited in the trap and can fragment or escape the trapping field. The similar process can be deployed by applying the AC signal to the end electrodes.

DC voltage pulses can be applied between any two opposite electrodes and the trapped ions of a wide mass range can be ejected from the RIT.

The RIT can be used to carry out various modes of mass analysis as described in the following:

a) Non-Scanning Ion Monitoring

Figure 5A:
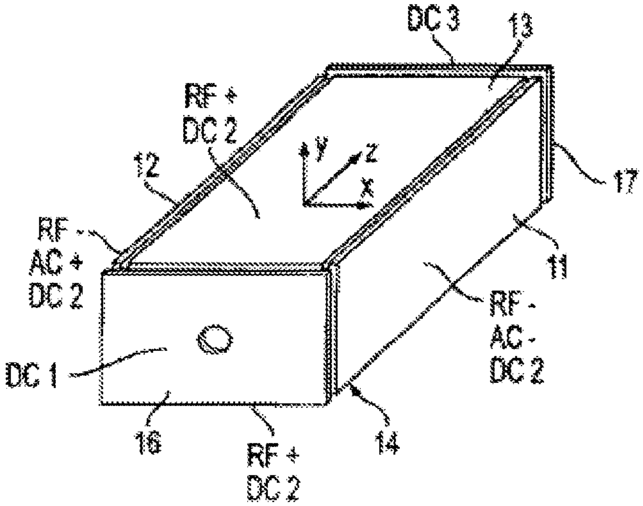
FIGS. 5A-B show a rectilinear ion trap which allows injection/ejection of ions along the z axis and DC trapping voltages.
Figure 5B:
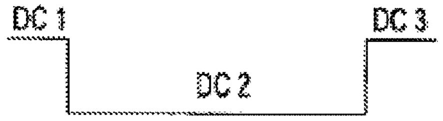
Figure 6A:
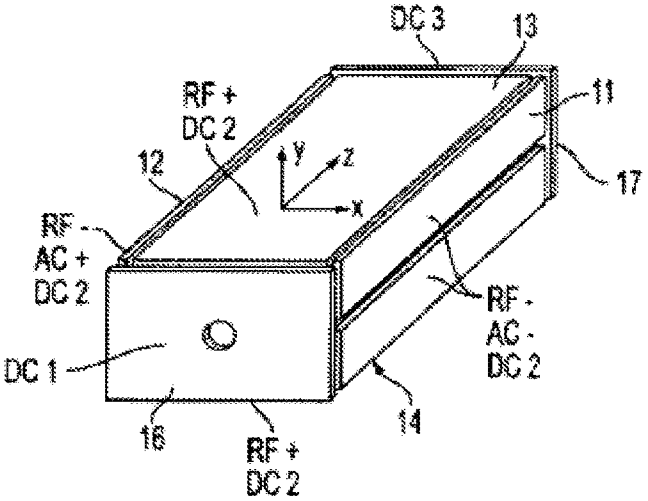
FIGS. 6A-B show a rectilinear ion trap with slits for ion injection/ejection along the x axis and DC trapping voltages.
Figure 6B:
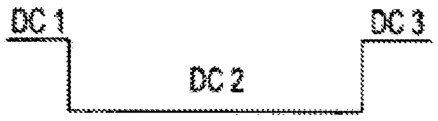

Using the simplest configuration, as shown in FIG. 5, single or multiple ion monitoring can be achieved by performing ion isolation and RF amplitude adjustments. Isolation of the ions of interest can be achieved by using the RF/DC (mass selective stability) or the waveform methods described above. i) For single-ion monitoring, ions of interest are isolated and then allowed to drift out of RIT in z direction by lowering the DC trapping field for detection or they can be pulsed out or AC excited out. ii) For multiple-ion monitoring, ions of several m/z values are monitored in sequence using multiple instances of the single ion monitoring method described above. iii) For $MS^n$ mass analysis, ions with m/z values of interest are isolated, excited by application of an AC voltage and fragment through CID. The product ions can be mass analyzed by single- or multiple-ion monitoring.

b) Scanning Ions Through the Apertures on the End Electrodes

Figure 14A:
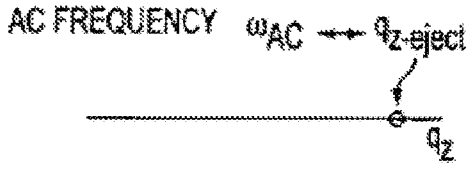
FIGS. 14A-B show the AC and RF voltages for mass selective ion ejection along the z axis through a hole in the end electrode of the rectilinear ion trap of FIG. 1.
Figure 14B:
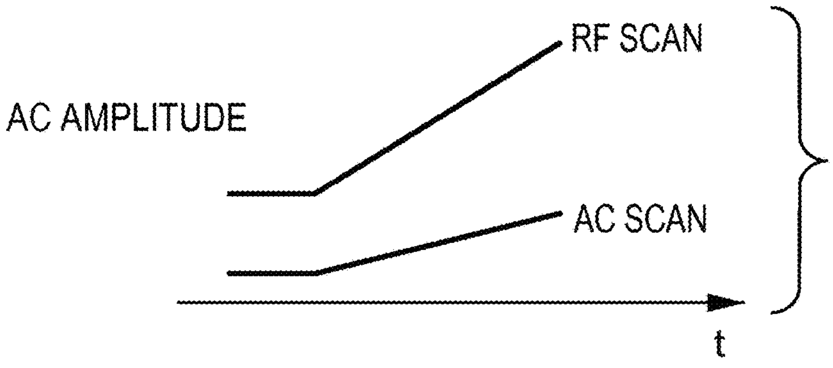
Figure 15:
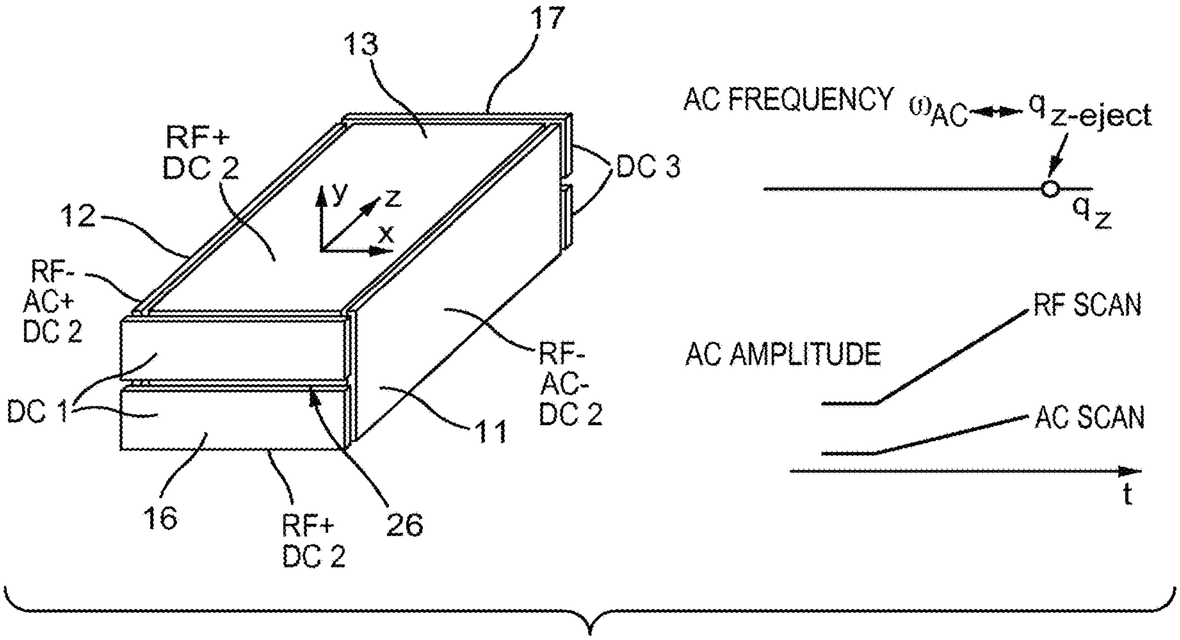
FIG. 15 shows a rectilinear ion trap for mass selective ejection through a slit in the end electrode with AC applied between the x electrodes.
Figure 16:
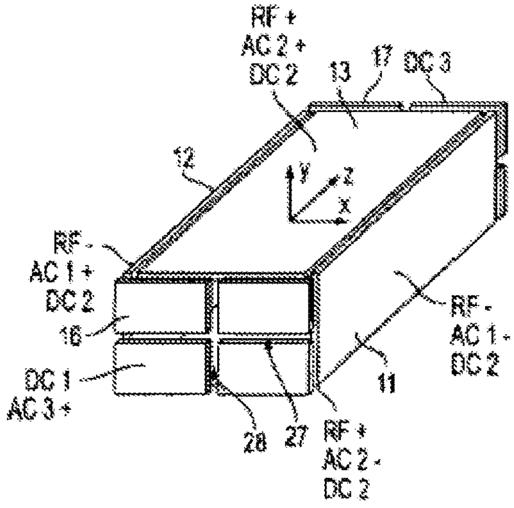
FIG. 16 shows a rectilinear ion trap for mass selective ejection through slits in the end electrode with AC applied either between the x or y electrodes.
Figure 17:
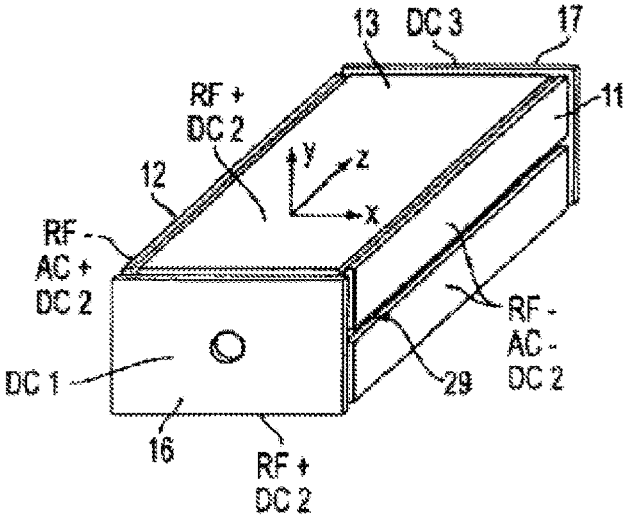
FIG. 17 shows a rectilinear ion trap for scanning ions through slits on the x RF electrodes by application of an AC scanning voltage to the x electrodes.
Figure 18:
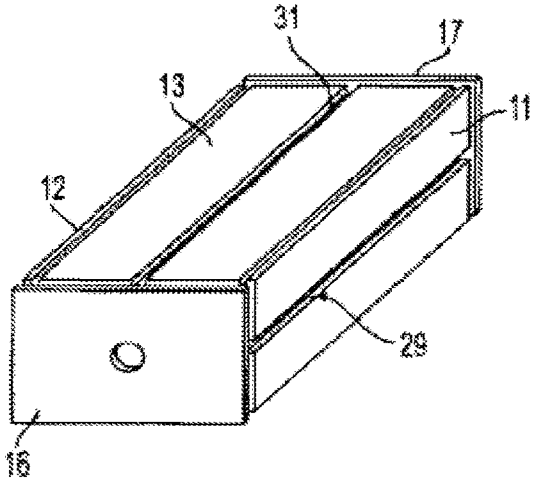
FIG. 18 shows a rectilinear ion trap for scanning ions through slits on the x or y RF electrode by application of an AC scanning voltage to the corresponding electrodes.

Mass instability scan can be implemented using an RIT with the geometry shown in FIG. 15. i) An AC signal is applied between the x (or y) electrodes, and scanned while the RF is scanned, FIG. 14B. The ions are mass-selectively ejected in the appropriate direction according to their m/z values (low to high) FIG. 14A. The opening in the end plate 16 should be a slit 26, FIG. 15, along the x axis to allow the ions oscillated by the AC signal along the x axis to be effectively ejected. ii) Double slits 27, 28 (crosses) in the end plate of the RIT, FIG. 16, allow the AC to be applied between either the x or y electrodes or both. The orientation (along the x or y axis) of the ion beam ejected from the RIT is selected by choosing the electrode pair (x or y) to apply the AC. This selection is appropriate in the cases where the ejected ion cloud shape needs to match the opening of next device, for instance, another RIT. If AC voltages of different frequencies are applied to the x and y electrodes, ions of two different masses are ejected from the slits.

c) Scanning Ions Through the Slits in the RF Electrodes i) By adding openings or slits 29 on the x (or y) electrodes and applying an AC voltage with selected frequency between these two electrodes, ions can be mass selectively ejected through the slits by scanning the RF amplitude, FIG. 17. Typically, the amplitude of the AC voltage can also be scanned to achieve better resolution.

ii) The RIT shown in FIG. 18 has slits 29 and 31 on both the x and y electrodes. The ejection direction can be selected by choosing the electrode pair, x or y, or both, to apply the AC signal. Ions of different masses can be ejected from each of the slits.

d) Scanning Ions Through Electrodes in any Direction

Figure 19:
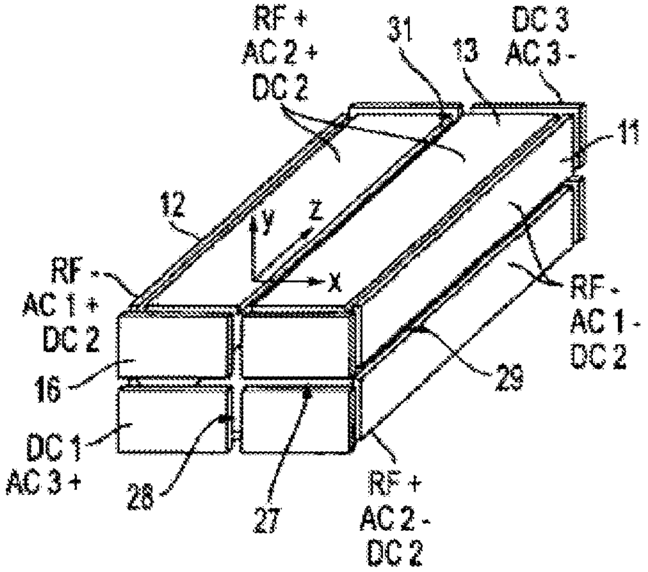
FIG. 19 show a rectilinear ion trap with slits in the RF and end electrodes allowing ions to be ejected in any direction.
Figure 20:
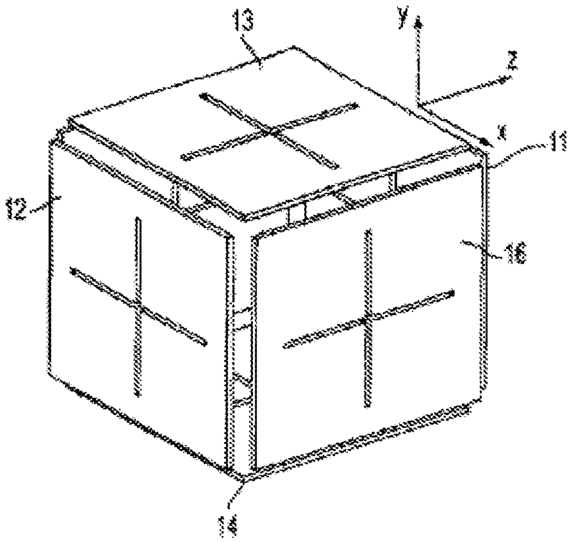
FIG. 20 shows a cubic rectilinear ion trap with crossed slits in each electrode whereby application of RF and AC voltages between selected pairs of electrodes allows ion ejection in the x, y or z direction.
Figure 21:
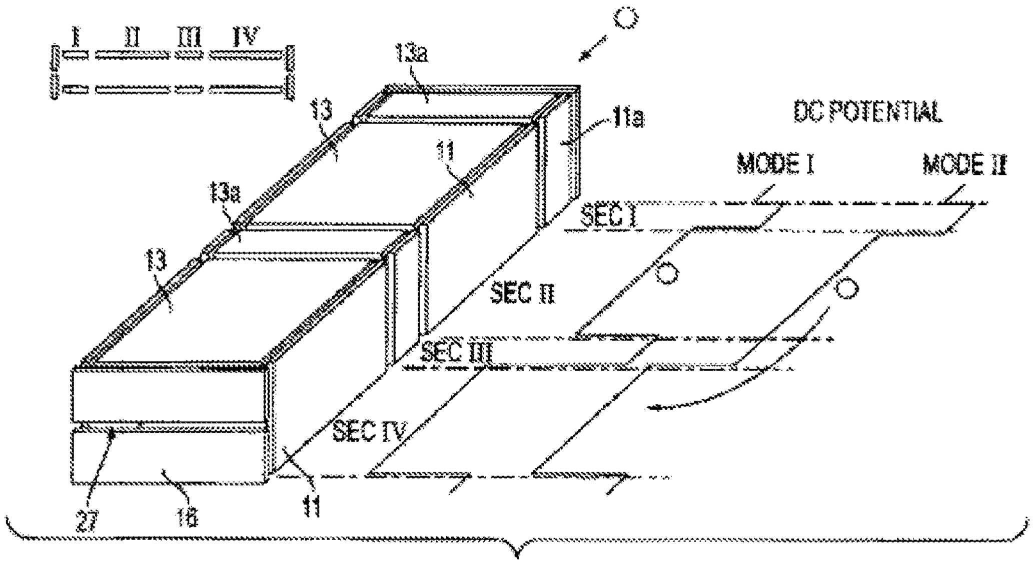
FIG. 21 shows a serial combination of rectilinear ion traps and applied DC voltages.
Figure 22:
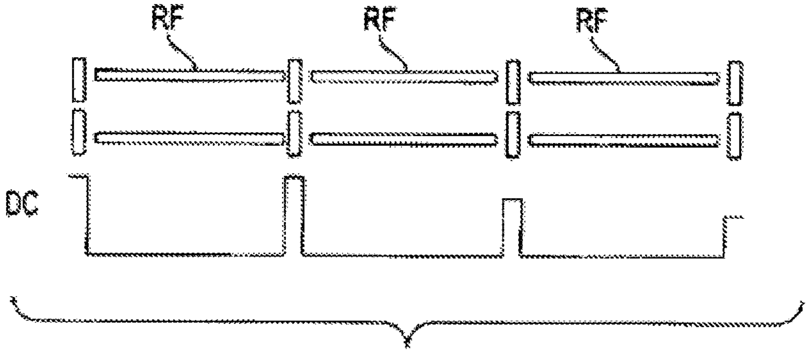
FIG. 22 schematically shows a serial array of ion traps of the same size.
Figure 24:
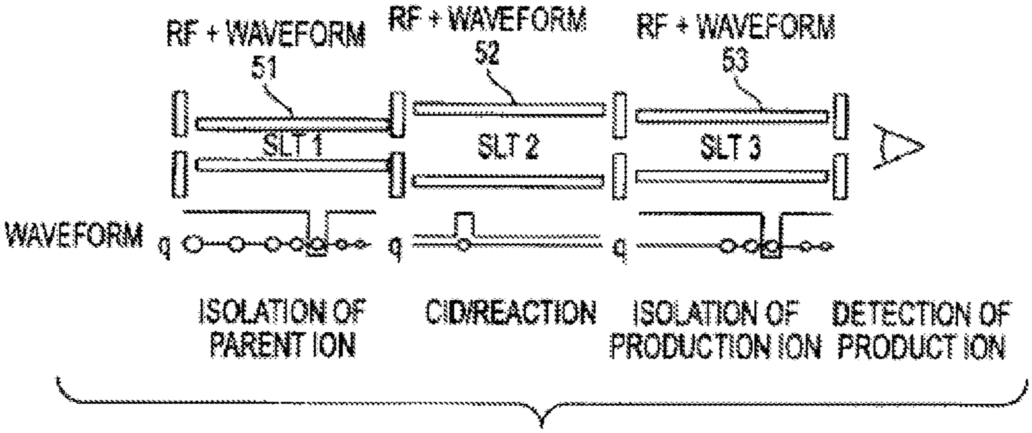
FIG. 24 schematically shows a serial array of rectilinear ion traps of different sizes.
Figure 23A:
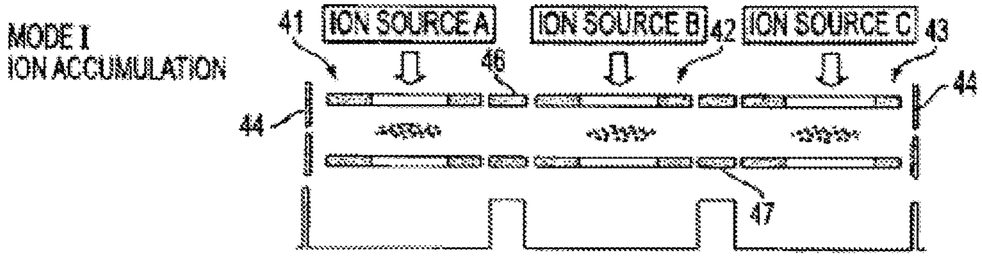
FIG. 23A-E schematically show various operational modes for three serially connected rectilinear ion traps.
Figure 23B:
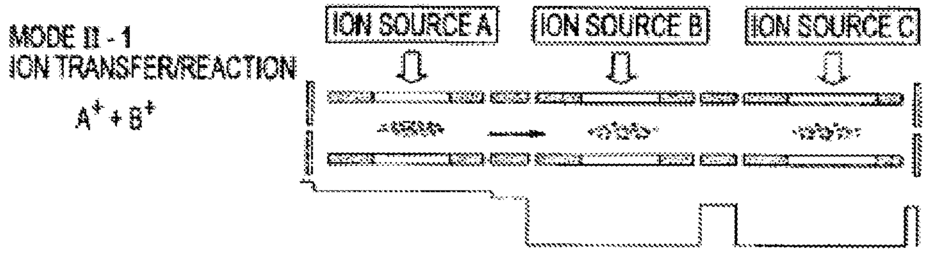
Figure 23C:
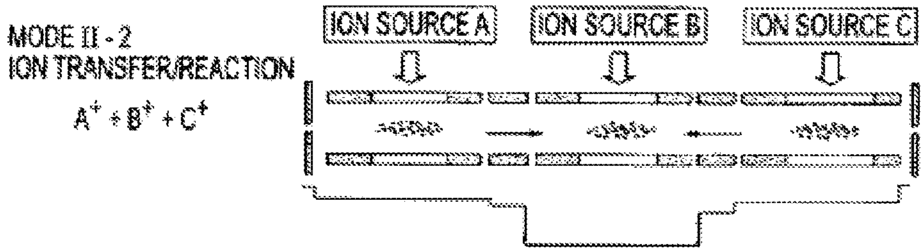
Figure 23D:
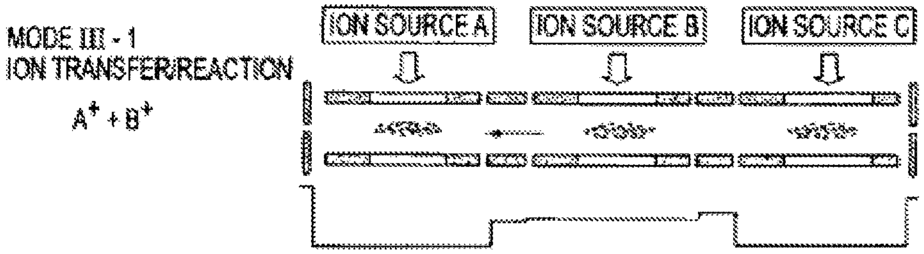
Figure 23E:
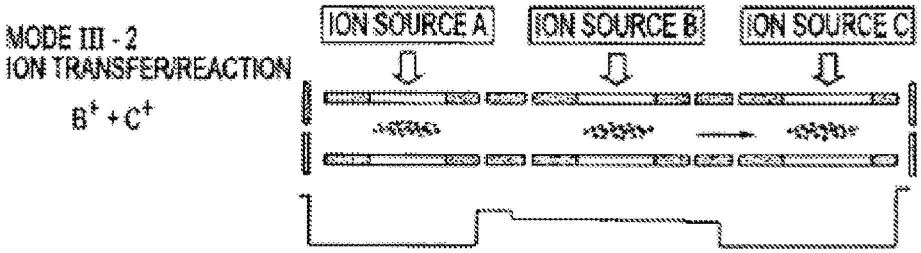

The RIT device shown in FIG. 19 combines the features of the configurations described above and allows ion injection and mass selective or non-selective ejection along any of the x, y or z axes. This type of RITs can transfer ions along any of the x, y or z directions by applying a DC pulse or an AC signal to the corresponding electrodes. The selection rules are as described above. An alternative geometry, cubic, with symmetric features on each of the electrodes is shown in FIG. 20. i) RF signals that differ in phase by 120 degrees can be applied to each pair of electrodes in the cubic device, FIG. 20, to establish a (rotating) 3D RF trapping field. ii) The RF trapping plane and the DC trapping axis can be selectively changed by choosing the electrode pair(s) to which to add RF or DC. The ejection modes using AC and DC can be applied by adding AC or DC signals to the corresponding electrodes. This device can work as a direction switcher in ion transfer operations. iii) An alternative trapping mode: Any two pairs of electrodes can be electrically connected to the same RF signal to form a "cubic trap" analogous to that in a cylindrical ion trap, and the other pair can act like a pair of endcaps by being grounded or being supplied with an RF 180 degrees different in phase.

e) Rectilinear Ion Traps can be Combined Multilaterally to Construct Various Devices.

i) A typical serial arrangement of RITs is shown in FIG. 21. The arrangement uses two RITs, sections II and IV, with RF trapping sections I and III and end plate 31 through which ions are introduced and end plate 32 with slot 33. The DC trapping voltages 34 and 36 applied to the electrodes are schematically shown. In Mode I, the DC potential wells are set up in a way that ions can be trapped in section II and section IV. In Mode II, the ions in section II are allowed to transfer to Section IV. Section III is used to minimize the interference between section II and IV, where different operations are performed on the ions. As one example, ions can be accumulated (mass-selectively or non-selectively) in section II while at the same time various operations like isolation, CID, ion/ion or ion molecule reactions, and mass selective ejection, can be performed in section IV.

ii) FIG. 22 shows RITs of the same size arranged in a serial configuration to act like a tandem mass spectrometer with properties that resemble a triple quadrupole mass spectrometer. The ions are transferred from one RIT to the next by changing the DC potentials in the same manner as shown in FIG. 21.

iii) FIGS. 23A-E show several operational modes of three RITs 41, 42 and 43 as for ion/ion reactions. Short RITs 46, 47 are used instead of end plate lenses for ion transfer to increase the ion transfer efficiency. FIG. 23A shows ions from external ion sources A, B and C injected into RITs 41, 42 and 43, respectively, where the ions are injected from ion source and accumulated in each by the application of DC trapping voltages to the end plates 44 short RF sections 46, 47 and RF voltage to the RITs 41, 42 and 43, FIG. 23A. By changing the DC trapping voltages as shown, ions trapped in RIT 41 are transferred to RIT 42 where they can react, FIG. 23B. FIG. 23C illustrates the DC voltages for transfer of accumulated ions from RITs 41, 43 into RIT 42. FIGS. 23D and 23E show DC voltages for transfer of ions from RIT 42 to RIT 41 and from RIT 42 to RIT 43, respectively. As one can notice, these operational modes have features significantly different from those for conventional serial configurations such as triple quadrupoles. The ions can be introduced in any stage in the structure; ions trapped in any stage can be isolated or excited to yield fragments; ions trapped in any stage can be transferred to others in both directions (forward and backward) to react with other ions or neutrals.

iv) Three RITs of different sizes, FIG. 24, are operated with a single RF signal of a constant amplitude. Two sets of waveforms, one for ion isolation and one for ion excitation, are applied to all x or y electrodes at different times to perform the desired operations. The size of the first RIT is selected based on the desired q for isolation of the parent ion. The equation used for the calculation of the size is:

$$x_0(\text{or } y_0) = \sqrt{\frac{keV_{RF}}{q\Omega^2 m}}, \quad \text{Eq. 5}$$

where $x_0$ ($y_0$) is the half distance between the x (y) electrodes.

Figure 25:
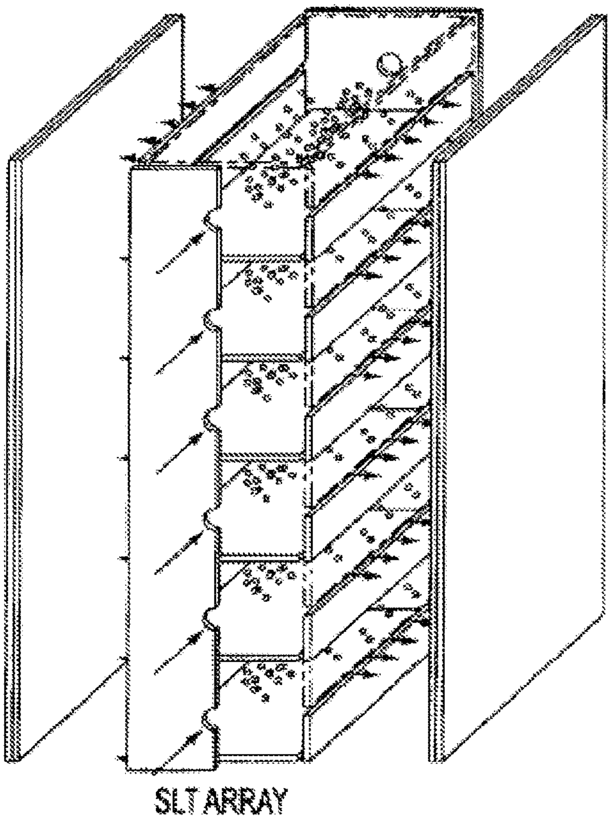
FIG. 25 is a perspective view showing a parallel array of rectilinear ion traps.
Figure 26:
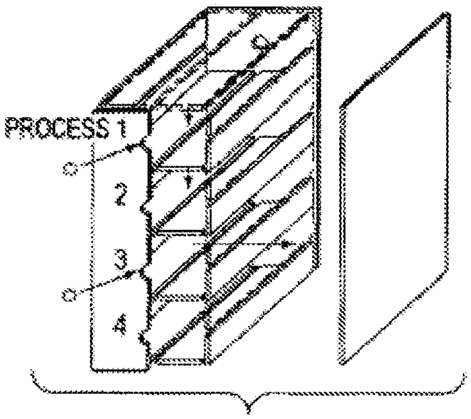
FIG. 26 is a perspective view showing a parallel array of rectilinear ion traps which performs a series of operations on an ion population.
Figure 27:
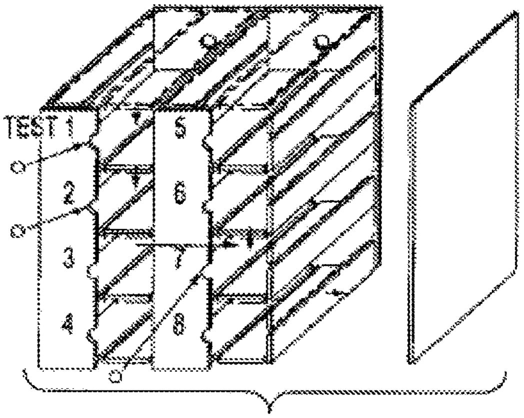
FIG. 27 is a perspective view showing two parallel arrays of rectilinear ion traps serially arranged.

Waveform I for ion isolation is also calculated based on this q. After ions are injected into RIT 51 and cooled, waveform I is applied and the parent ions of a desired m/z are isolated; the DC potentials along the beam axis are adjusted so that the parent ions are transferred into the second RIT 52. The size of RIT 52 is selected based on the parent ion m/z value and the desired q for CID or ion/molecule reactions and waveform II for CID is also calculated based on this q. The parent ions are fragmented by applying waveform II or reacting with molecules or other ions to generate product ions; the product ions are transferred to RIT 53 when the DC potentials are adjusted. The size of the third RIT is calculated based on the m/z of the product ion to be isolated and monitored. The q for isolation can be the same as that for RIT 51, so the same waveform can be used for isolation in RIT 53; the size of RIT 53 is calculated based on the q and the m/z value of the ions to be isolated/monitored. The isolated ions are ejected for external detection. This type of serial arrays provides analysis processes such as $MS^n$ using RITs without requiring dedicated electronics to scan RF voltages. The isolation in RIT I and III can also be achieved using RF/DC isolation at the appropriate q value.

v) Because of their rectangular shape and the ability to eject ions in the x and y direction as well as the z directions, it is possible to have parallel arrays as well as serial arrays and combination serial and parallel arrays. FIG. 25 shows ions from a single sample injected in the z direction into all the RITs of a parallel array, cooled and then mass analyzed. The total number of ions trapped and detected is proportional to the number of RITs and the sensitivity of the multiple-channel RIT array mass. Ions from different samples can be injected into different RITs and each RIT can serve as an independent mass analyzer. Individual detectors, not shown, can be used for each channel or imaging detectors which process spatially resolved signals can be used to detect the ejected ions. Analytes in multiple samples can be ionized and mass analyzed simultaneously to achieve high-throughput analysis of large numbers of samples. The same parallel array can also be used to perform high-selectivity analysis by allowing the ions to go through various selective processes in the gas phase before final mass analysis and detection. As shown in FIG. 26, the ions injected into RIT 1 can be mass-selectively isolated, then transferred through a slot in the electrode into RIT 2 for ion/molecule reactions, transferred through a slot in the electrode into RIT 3 for ion/ion reactions and then mass-analyzed by ejecting through a slot in the electrode. Obviously, the device can have more channels to allow more processes in the high-selectivity mode as well as stronger signals in the high-sensitivity mode and more samples to be analyzed simultaneously in the high-throughput mode. FIG. 27 shows the combination of parallel arrays serially connected.

Figure 28:
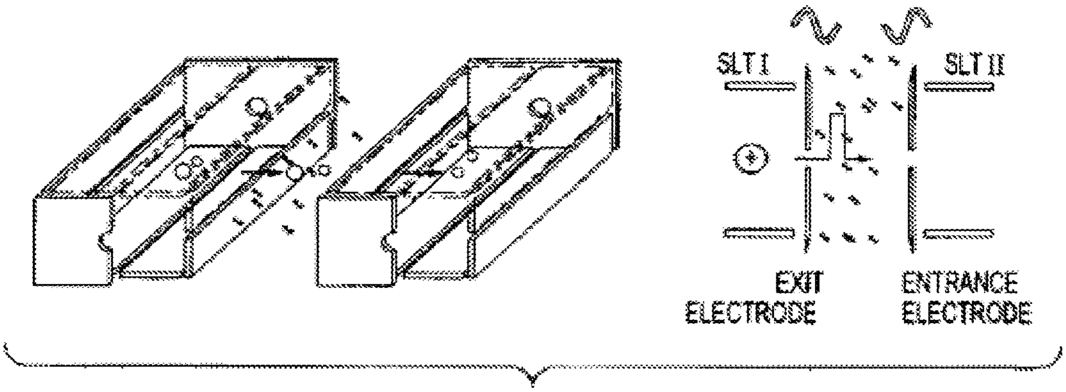
FIG. 28 is a perspective view of a parallel array for ion mobility measurement.
Figure 29:
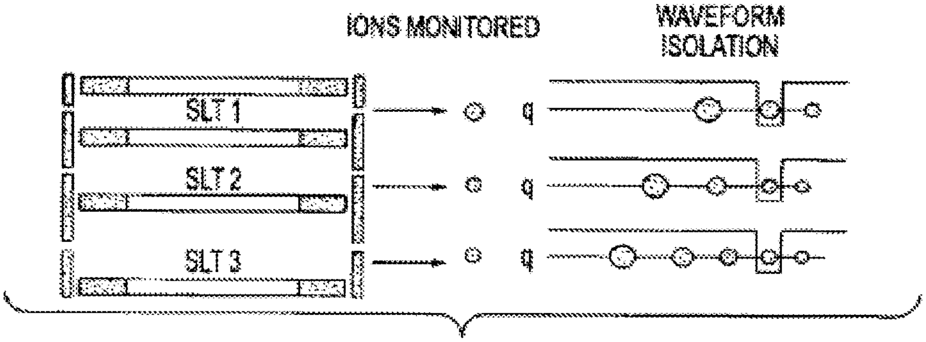
FIG. 29 schematically shows a parallel array of rectilinear ion traps of variable sizes for non-RF-scan multiple process analysis.
Figure 30:
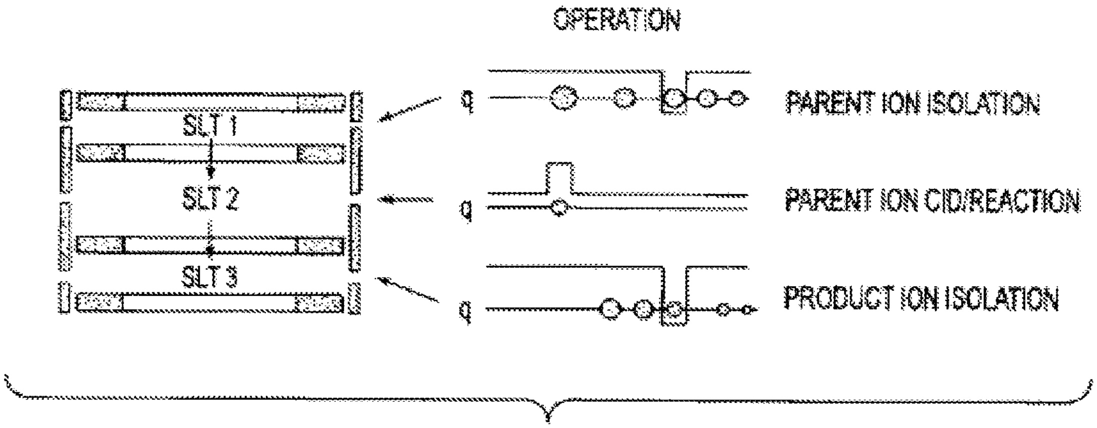
FIG. 30 schematically shows another parallel array of rectilinear ion traps of variable sizes for non-RF-scan multiple process analysis.

The capability to transfer ion populations into adjacent traps in either the x or y direction allows ions of given mass/charge ratio to be placed anywhere within a three dimensional ion trapping array. The ability to fix spatial positions of chemically distinctive species allows a variety of potential applications including (i) pattern transfer to adjacent surfaces by ion/surface reactions and ion soft-landing; (ii) ion annihilation experiments in which ions of opposite charge are stored in adjacent elements before the electrodes potentials are reduced to allow reactive mixing (iii) high density information storage consisting of three spatial dimensions and one mass/charge dimension.

vi) When the ions are transferred from one RIT to another using a DC pulse, as shown in FIG. 28, the ions ejected from the first RIT can only enter the second RIT during a very specific narrow RF phase window. The ions leaving the exit slit of the first RIT at the same time may not reach the entrance slit of the second RIT at the same time due to the difference in the collision cross-section for collisions with He. By carefully selecting either the ejection RF phase, the distance between the RITs, or the pressure of He, ions with different cross-section will be separated in space due to the different ion mobility and some of them can be trapped in the second RIT and others may not. In comparison the ions in the first RIT and the ions trapped in the first RIT, the cross-sections of the ions can be estimated.

vii) Just as in the case of serial RITs, parallel RITs of different sizes can be operated with a single RF signal at constant amplitude. The RIT sizes can be calculated using Eq 1 such that the ions to be monitored in each RIT are operated at the same q value for ion isolation. As shown in FIG. 29, a single waveform with a notch at the same q is applied to all RITs and the ions with corresponding m/z values or ranges of m/z values are isolated and trapped in each RIT. The trapped ions are later ejected along the x/y or z direction to be detected. The alternative ion isolation method is RF/DC isolation. FIG. 30 shows an alternative arrangement for a parallel array. Instead of transferring ions along the z axis, the ions are transferred along the y axis and sequentially experience the processes illustrated in the serial array of FIG. 24.

Figure 31:
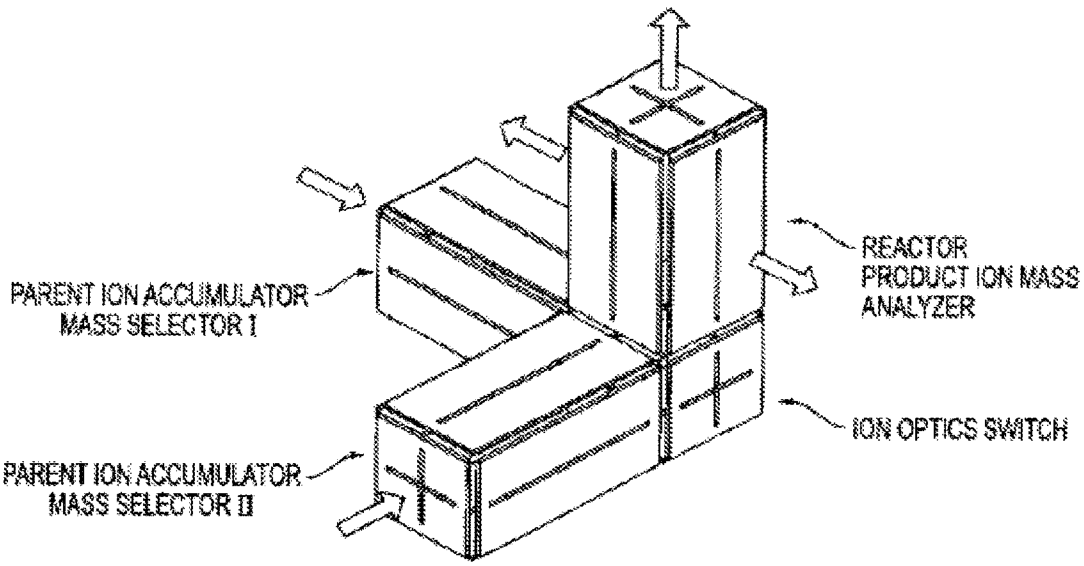
FIG. 31 is a perspective view of rectilinear ion traps arranged in a three dimensional array.

Another way to construct an RIT array is to use the cubic ion trap as the joint between RITs (FIG. 31). The ions from one RIT can be transferred into the cubic trap, stored and then transferred into the next RIT. With the same configuration, the ions injected into the cubic trap can be transferred in any of the six directions by applying DC pulse or AC waveforms. The RITs of different sizes can be connected using the cubic traps to form various arrays.

The foregoing are only examples of how RITs can be used and combined to carry out analysis and manipulation of ions. The plate configuration facilitates and simplifies the fabrication of ion traps. The simple rectangular configuration of the ion trap permits multilateral combinations of rectilinear ion traps.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

EXAMPLES

Tandem mass spectrometry (MS/MS) (Sleno et al., Journal of Mass Spectrometry, 2004, 39, 1091-1112) has been widely used for analysis of chemical and biological compounds in samples with complex matrices. The precursor ions are isolated and fragmented with the product ions mass analyzed. Ion traps are a popular mass analyzer that can perform multiple-stage MS/MS analysis. In the current commercial mass spectrometers, the MS/MS analysis can be performed fast with a scan time of about 100 ms for each compound; however, the sample usage is of low efficiency since the ions other than the target precursor ions are wasted during the isolation process. For miniature mass spectrometry (MS) systems (Ouyang et al., Annual Review of Analytical Chemistry, 2009, 2, 187-214), the MS/MS plays an even more essential role and the efficiency improvement for the MS/MS process may also have more significant impacts. The sample preparation and chromatographic separation for in-situ or in-field analysis should be highly simplified or completely eliminated, as demonstrated with the recent development of miniature MS systems (Hendricks et al., Analytical Chemistry, 2014, 86, 2900-2908; and Li et al., Analytical Chemistry, 2014, 86, 2909-2916) with ambient ionization (Cooks et al., Science, 2006, 311, 1566-1570; and Monge et al., Chemical Reviews, 2013, 113, 2269-2308) sources. However, it is necessary to use MS/MS to differentiate isomers and isobars and the limit of detection (LOD) and limit of quantitation (LOQ) can also be significantly improved (Li et al., Analytical Chemistry, 2014, 86, 2909-2916) with the chemical noise removed through the MS/MS process (Cooks et al., Science, 1983, 222, 273-291). Using the characteristic fragmentation pattern for confirmation of the chemical identification, high specificity potentially could also be retained for miniature mass spectrometers without ultra-high mass accuracy or resolution.

Figure 32A:
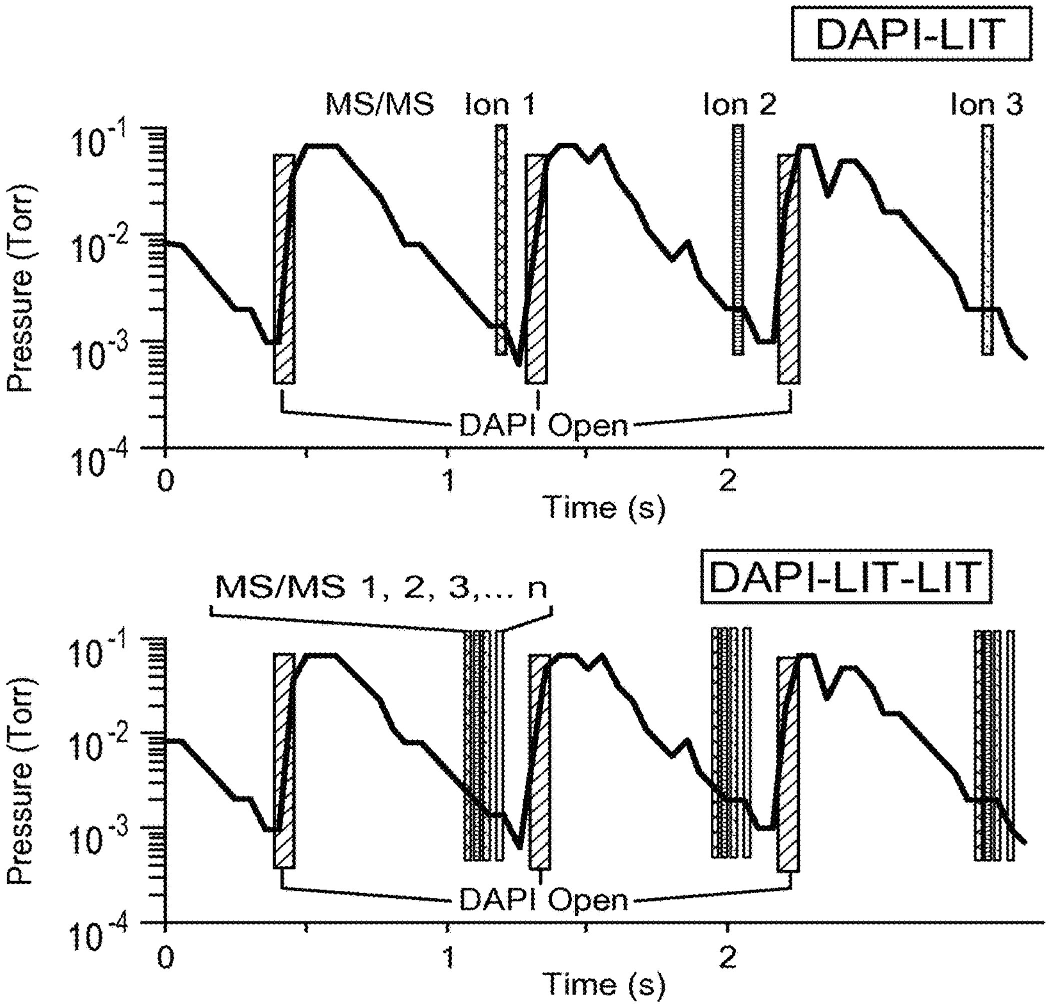
FIG. 32A shows a comparison of MS/MS analysis for DAPI MS instruments with one LIT and dual LITs.
Figure 32B:
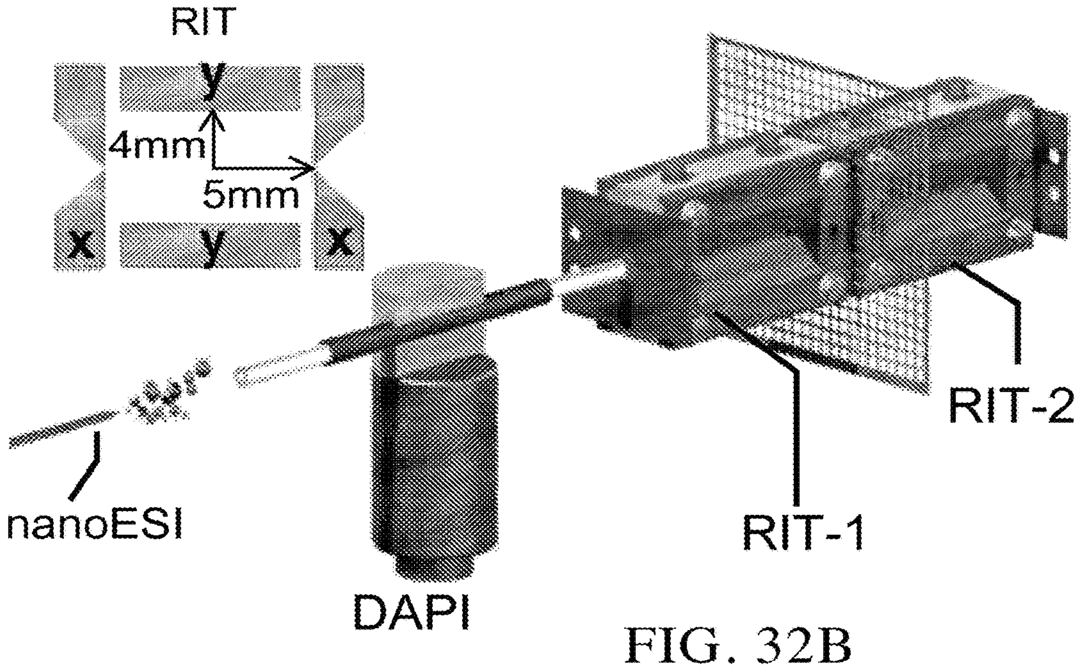
FIG. 32B shows a DAPI-RIT-RIT configuration for MS/MS analysis.

Currently, discontinuous atmospheric pressure interface (DAPI; Gao, Analytical Chemistry, 2008, 80, 4026-4032; Gao et al., International Journal of Mass Spectrometry, 2009, 283, 30-34; and Xu et al., Analytical Chemistry, 2010, 82, 6584-6592) has been used to enable the coupling of atmospheric pressure ionization and ambient ionization sources with miniature linear ion trap (LIT) mass spectrometers (Hendricks et al., Analytical Chemistry, 2014, 86, 2900-2908; Li et al., Analytical Chemistry, 2014, 86, 2909-2916; and Gao et al., International Journal of Mass Spectrometry, 2009, 283, 30-34). The ions are introduced in a pulsed fashion with about 20 ms opening of the DAPI in about every 1.5 s, which allows the ions to be injected and trapped in the LIT at an elevated pressure and analyzed after the pressure drops back to millitorrs level in 500-800 ms (FIG. 32A). The required pumping capacity is highly reduced for DAPI-LIT systems, while the efficiency and scan speed for MS and MS/MS analysis are also reduced. The waste of samples due to the low duty cycle, e.g. 20 ms ion introduction in every is or longer, could be minimized by using a pulsed ion source synchronized with the DAPI operation (Xu et al., Analytical Chemistry, 2010, 82, 6584-6592). However, for MS/MS analysis of multiple analytes in a sample, the entire process could take a significantly long time.

In the Example below, a solution for the above problem was discovered using a dual LIT configuration to execute multiple MS/MS analyses with a single ion introduction (FIG. 32A). The ions in a broad mass-to-charge ratio (m/z) range were trapped in the first LIT and the precursor ions of multiple m/z ranges could be sequentially, mass selectively transferred to the second LIT for MS/MS analysis. In the current Examples, the precursor ions of a m/z value were axially, mass selectively transferred to the second LIT for MS/MS analysis, while other ions were still trapped in the first LIT for subsequent mass-selective transfers and MS/MS analyses. For implementation of the concept, we also combined the axial (Hager, Rapid Communications in Mass Spectrometry, 2002, 16, 512-526) and radial (Schwartz et al., Journal of the American Society for Mass Spectrometry, 2002, 13, 659-669) mass-selective ion ejection methods, previously developed for two popular commercial ion trap instruments, to demonstrate the high efficiency MS/MS analysis.

Example 1: Instrumentation, Results and Discussions

Figure 33A:
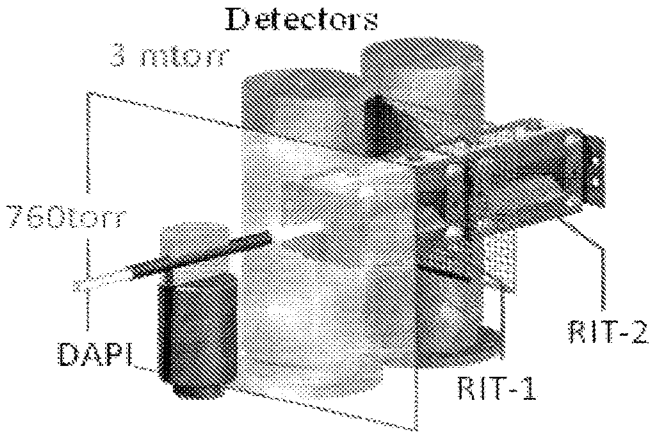
FIG. 33A shows an instrument setup for testing a DAPI-RIT-RIT configuration. Two ion detector assemblies were used. The ions trapped in RIT-1 could also be monitored directly by an RF scan with radial ejection, for which the DC voltage on the common mesh end electrode was raised high (>10 V) to prevent the axial ejection. The manifold pressure increased to about 500 mTorr with a 20 ms opening of the DAPI, which use a 500 μm i.d., 30 cm long capillary as the flow constraint. A delay of about 500 ms after DAPI opening was used to allow the manifold pressure to be pumped down to about 3 mtorr for MS or MS/MS analysis. The mesh electrode between two RITs was made from Corrosion-Resistant 304 Stainless Steel Woven Wire Cloth with an open area of 65% and wire thickness of 0.0075".

Rectilinear ion traps (RIT; Ouyang, Analytical Chemistry, 2004, 76, 4595-4605) previously used in development of a series of miniature mass spectrometers (Hendricks et al., Analytical Chemistry, 2014, 86, 2900-2908; Li et al., Analytical Chemistry, 2014, 86, 2909-2916; Gao et al., Analytical Chemistry, 2006, 78, 5994-6002; and Gao et al., Analytical Chemistry, 2008, 80, 7198-7205), were used for an initial test of this dual-LIT concept (FIG. 32A and FIG. 33A). Each of the two RITs has a stretched geometry with an inter-electrode distance of 5.0 mm in the x direction and 4.0 mm in the y direction. A stainless steel mesh was used as the common end electrode between these RITs. A testing system previously reported (Xu et al., Analytical Chemistry, 2010, 82, 6584-6592) was modified for the experimental characterization. The distances between each end electrode to the adjacent RF electrodes are all 2 mm. A bulk loaded sprayer, pulled from a boron silica glass capillary (0.85 mm i.d. and 1.5 mm o.d.), was used for nanoESI. All chemicals were commercially available and used without purification. The amitriptyline-d6 was purchased from CDN isotopes (Pointe-Claire, Quebec, Canada). All other chemicals were obtained from Sigma-Aldrich (St. Louis, MO).

Single phase RFs of 1015 kHz and 995 kHz were applied on the y electrodes of the RIT-1 and RIT-2, respectively. The ions were trapped in RIT-1 during the DAPI opening period and then an axial mass selective ejection toward RIT-2 was performed using two methods, an RF scan with a resonance ejection by a dipolar AC (Hager, Rapid Communications in Mass Spectrometry, 2002, 16, 512-526), or an AC excitation with a steady RF. Adjustments in wide ranges were performed for the RF voltages, AC excitation frequency (q value) and amplitude, as well as the DC voltage on the common mesh end electrode.

Figure 33B:
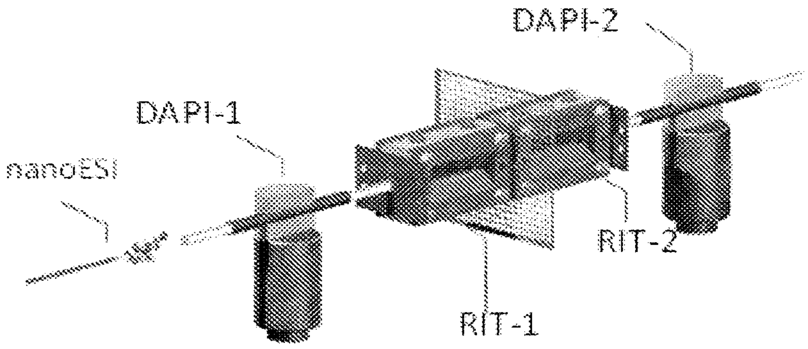
FIG. 33B shows an instrument set-up similar to that shown in FIG. 33A. In this set-up, a 500 μm i.d., 35 cm long capillary was used as the flow constraint to introduce air to increase the manifold pressure from 3 mtorr to 10 mtorr immediately before the mass-selective ion transfer.
Figure 34A:
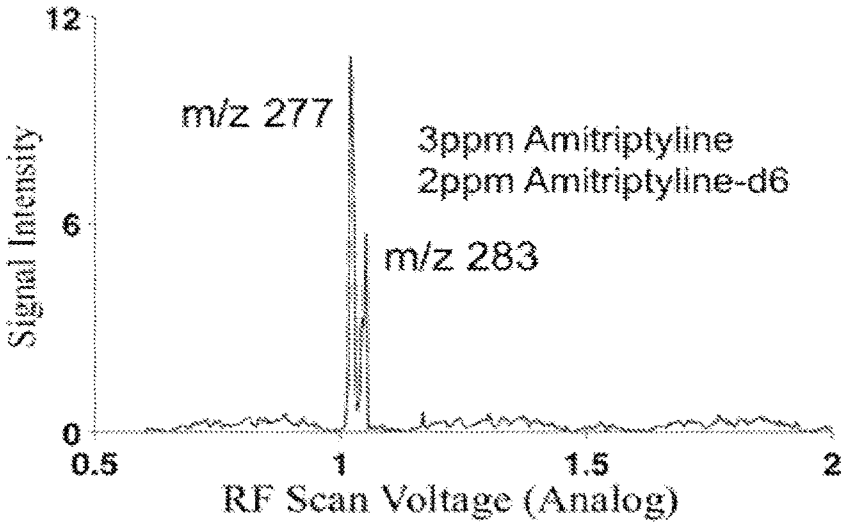
FIG. 34A shows an MS spectrum recorded for amitriptyline and amitriptyline-d6 (in methanol, ionized by nanoESI), single phase RF of 1.015 MHz applied on y electrode, dipolar AC applied between the x electrodes for resonance ejection at 165 KHz with 80 mVp-p.

The axial mass-selective ion ejection from RIT-1 was then characterized using the setup shown in FIG. 33B. Efficient axial ion ejection with AC excitation was observed and MS spectra were recorded with one example shown in FIG. 34A for amitriptyline (4 g/mL) and amitriptyline-d6 (2 μg/mL) in methanol ionized by nanoESI (electrospray ionization; Wilm, Analytical Chemistry, 1996, 68, 1-8).

Figure 32C:
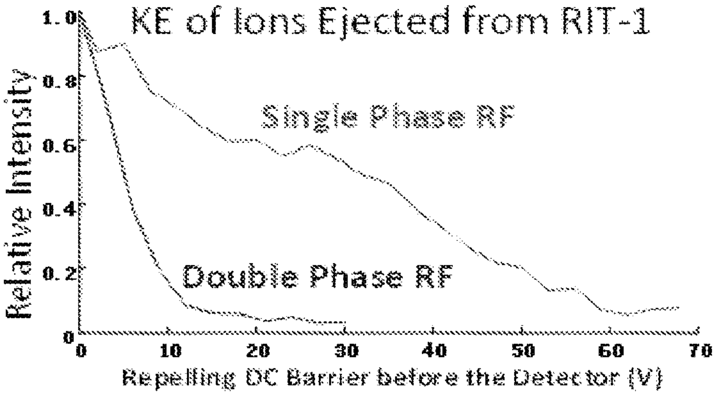
FIG. 32C shows the signal intensities measured for amitriptyline ions m/z 278 reaching the ion detectors as a function of the repelling voltage.
Figure 34B:
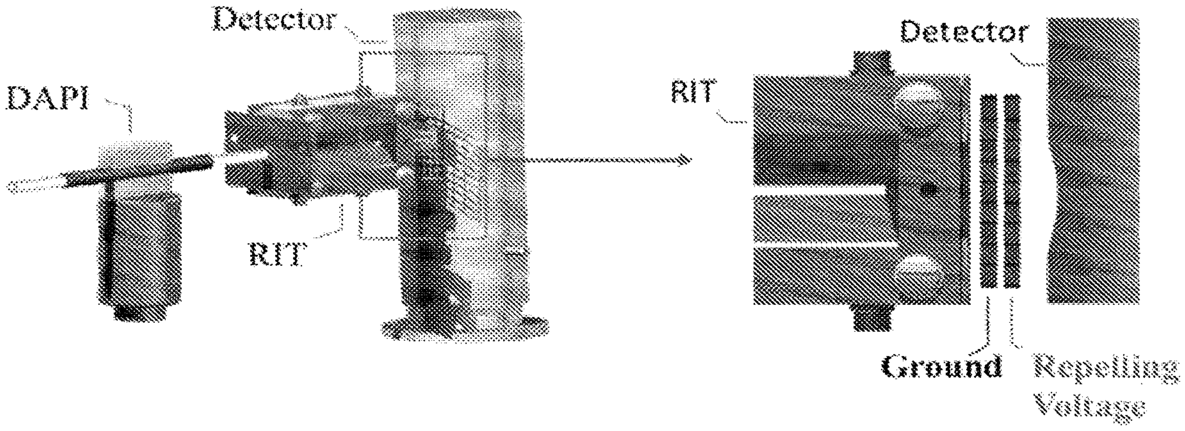
FIG. 34B shows an instrument setup for detecting the axial ejection of the ions from RIT-1. An extra mesh electrode (see magnified right panel of figure) was inserted in front of the ion detector to apply a repelling potential. The kinetic energies of the ions axially ejected out of the RIT-1 needed to be high enough to overcome the barrier to reach the ion detector. By varying the repelling potential, the KE of the ions were profiled.
Figure 35A:
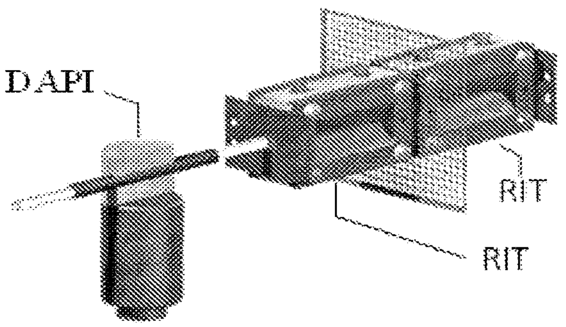
FIGS. 35A-E: COMSOL (ver. 4.3*a*, COMSOL AB, Stockholm, Sweden) was used to solve the electric fields for the dual LIT configurations studied herein. For a RIT-RIT (FIG. 35A) of stretched geometries (FIG. 35B), the potential along the center axis can oscillate at an amplitude as high as 128 V when a single phase RF of 200V is applied (FIG. 35C, top panel).
Figure 35B:
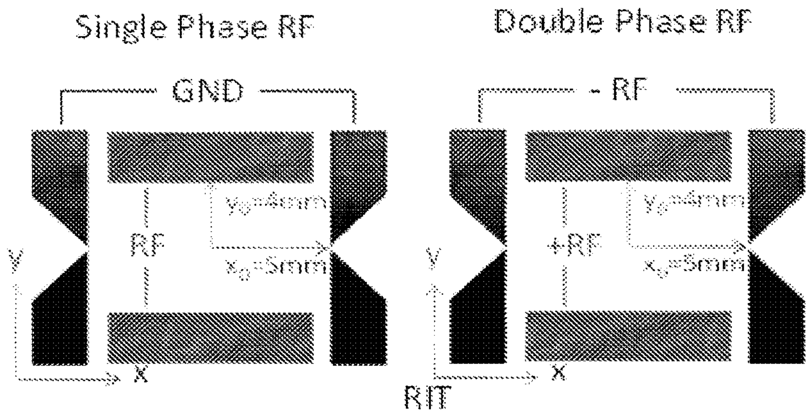
Figure 35C:
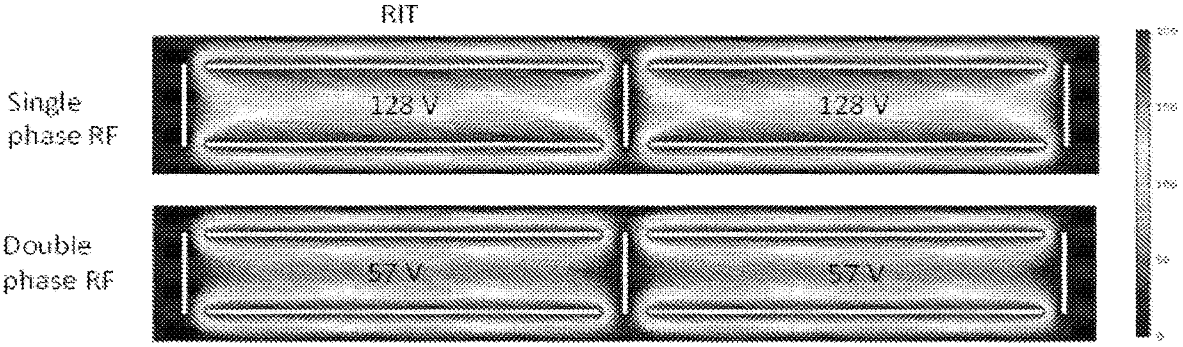
Figure 35D:
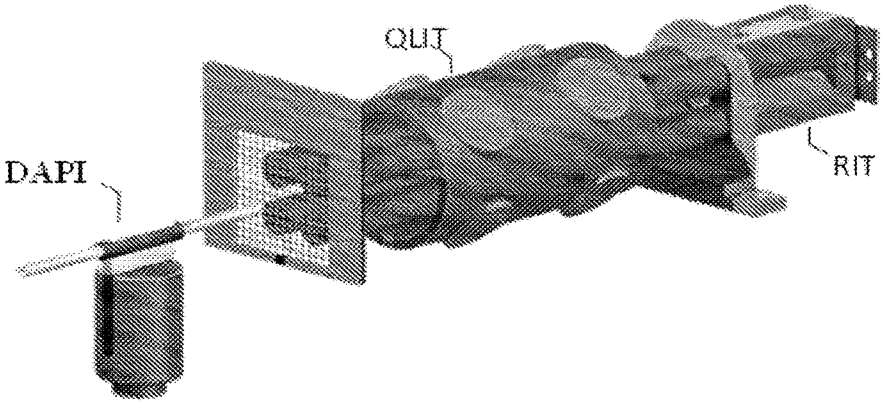
Figure 35E:
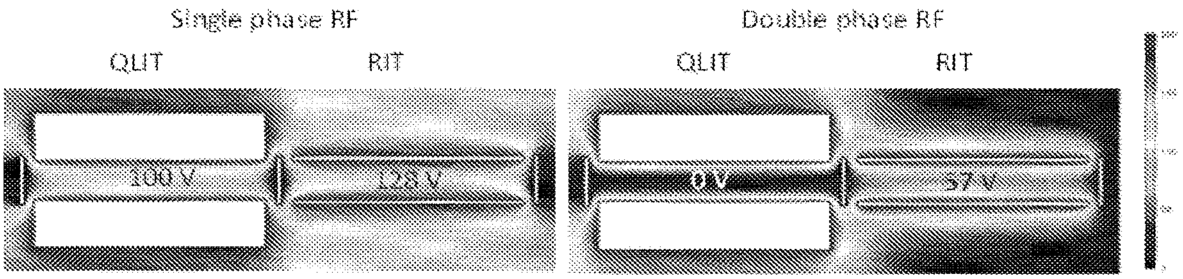

A mesh electrode was then added between the mesh end electrode of the RIT and the ion detector assembly to apply a repelling voltage, as shown in FIG. 34B, to control the kinetic energy (KE) of the ions ejected from RIT-1. The signal intensity of amitriptyline m/z 277 was measured as a function of the repelling voltage, reflecting a wide kinetic energy (KE) distribution up to 70 eV (FIG. 32C).

It is known that the field at the center axis of the LIT oscillates with unbalanced RF voltages applied on the LIT, which was responsible for the wide distribution of the KE for the axially ejected ions. A double phase RF was then applied on the RIT-1. The characterization of KE showed a much narrower distribution below 10 eV for the axially ejected ions (FIG. 32C).

Figure 32D:
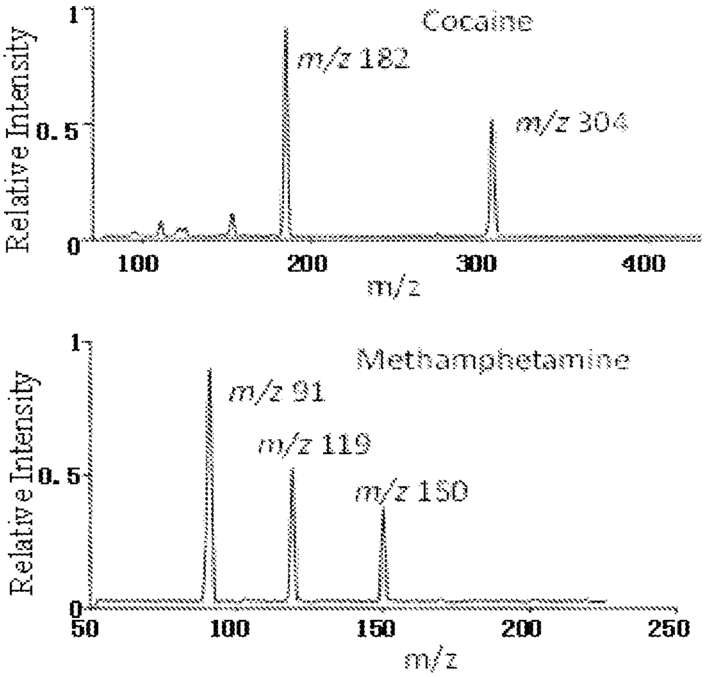
FIG. 32D shows MS spectra recorded by RIT-2 for protonated cocaine m/z 304 and methamphetamine m/z 150, each mass-selectively transferred from RIT-1 to RIT-2, ions generated by ESI of methanol solutions containing only 1 μg/mL cocaine or only 500 ng/mL methamphetamine, AC excitation of 80 mV and 168 kHz, q=0.45 in RIT-1, low mass cutoff=67 for trapping the ions in RIT-2.

In another configuration, collisional cooling was used. To that end, a second DAPI was then used to introduce a gas flow for 10 ms immediately before the ion ejection to increase the manifold pressure from 3 mtorr to 10 mTorr. An AC excitation of 80 mV at 148 kHz (q=0.4) was used to mass selectively eject the ions from the RIT-1, followed by an MS analysis in RIT-2 after the pressure decrease to 3 mtorr in about 100 ms. The trapping of transferred ions in RIT-2 was observed. At certain times, fragmentations were also observed as shown by the MS spectrum recorded for the protonated cocaine m/z 304 and methamphetamine m/z 150 (FIG. 32D). The collisions helped to reduce the kinetic energies of the ions and also facilitated the collisional induced dissociation (CID) that is efficient at the elevated pressure. A complete transfer of the ions could take as long as 80 ms. For practical implementation, the fragmentation of the precursor ion during the mass selective transfer represents an advantage since operation for CID is not required for RIT-2.

Figure 33C:
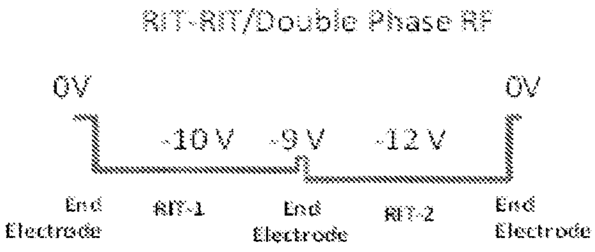
FIG. 33C shows the DC potential along the center axis during the mass-selective ion transfer in RIT-RIT driven by double phase RFs.
Figure 33D:
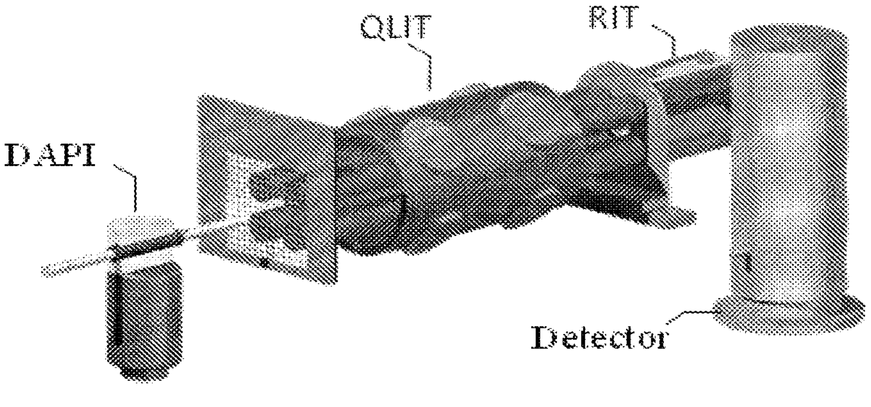
FIG. 33D shows a DAPI-QLIT-RIT setup with a single ion detector assembly.
Figure 36:
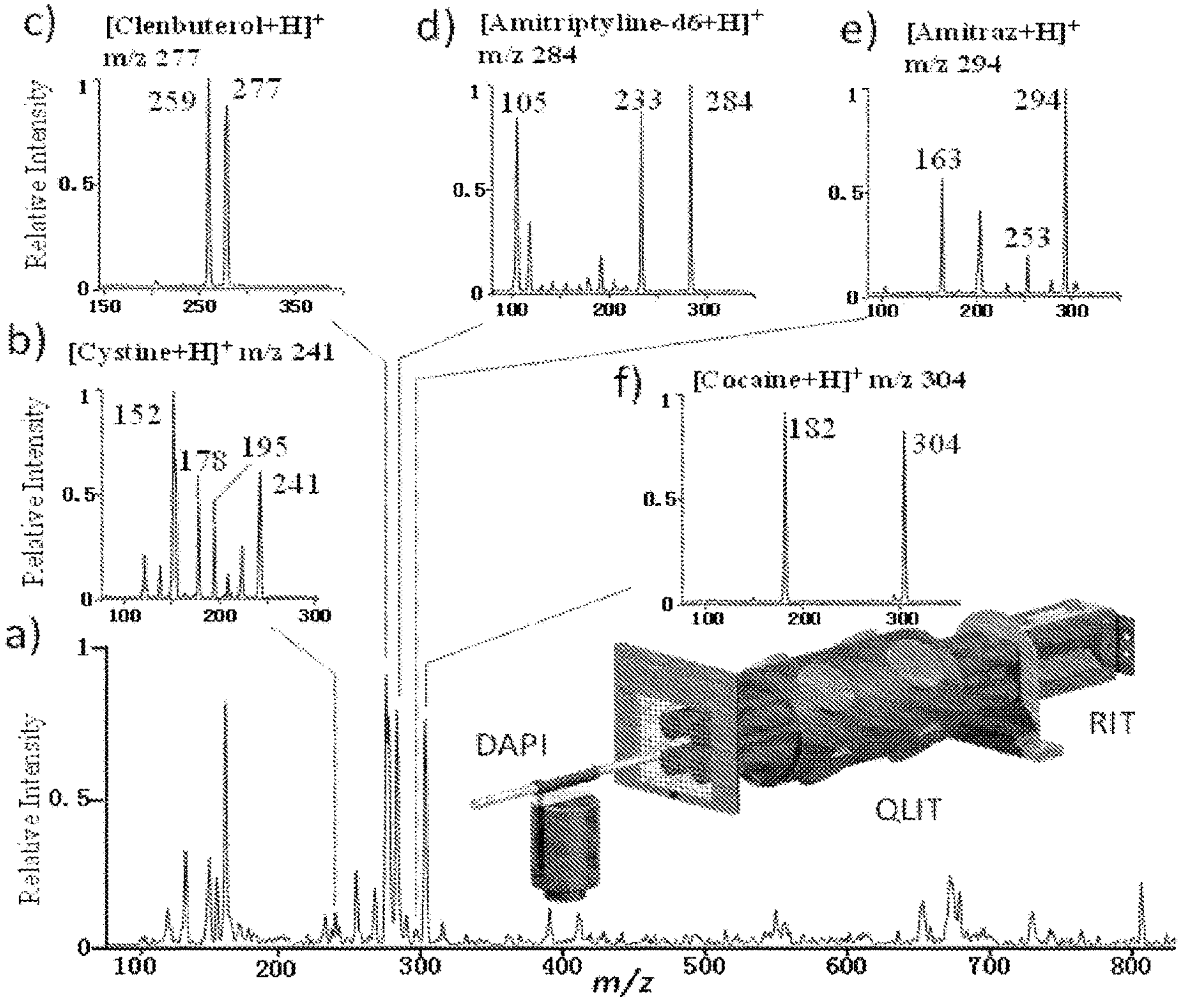
FIG. 36 panel A shows MS spectrum recorded by RIT for ions transferred from QLIT without mass selection. MS/MS spectra of protonated cysteine m/z 241 (FIG. 36, panel B) clenbuterol m/z 277 (FIG. 36, panel C), amitriptyline-d6 m/z 284 (FIG. 36, panel D), amitraz m/z 294 (FIG. 36, panel E), and cocaine m/z 304 (FIG. 36, panel F), precursor ions of each compounds mass selectively transferred from QLIT to RIT, fragmented in RIT, and MS analyzed. AC excitation of 80 mV and 169 kHz, q=0.45 in QLIT; q=~0.2 for the trapping the ions in RIT, q=~0.2 for CID in RIT.
Figure 37:
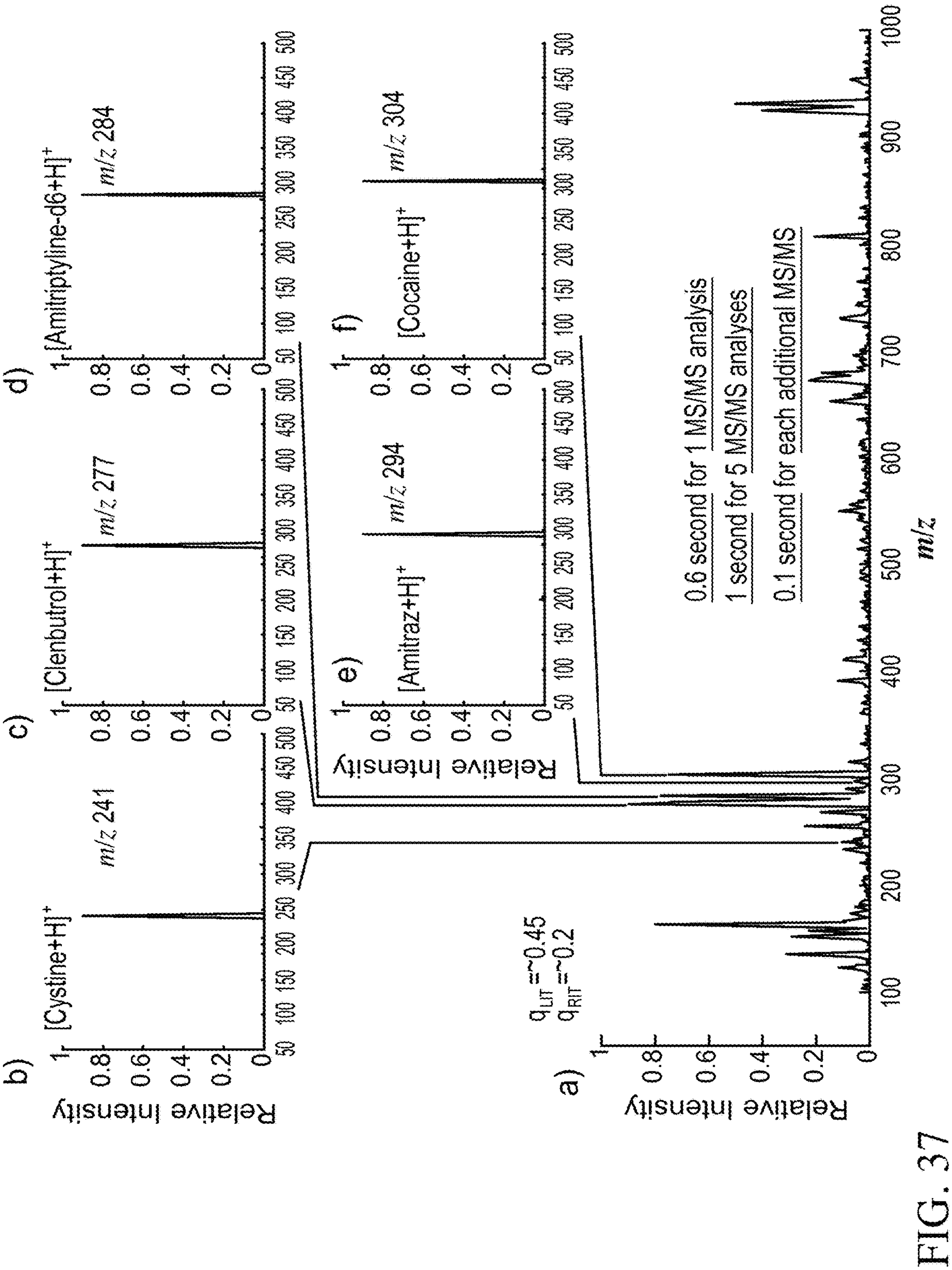
FIG. 37 panels A-E show that a mixture of clenbuterol (1 μg/mL), amitriptyline-d6 (1 μg/mL), amitraz (200 ng/mL), cysteine (500 ng/mL) and cocaine (500 ng/mL) in a methanol solution was ionized by nanoESI. The ions were introduced through DAPI and trapped in the QLIT.

To further reduce the KE of the axially ejected ions, a LIT of a symmetric configuration (QLIT), previously used in development of the QTrap instruments (AB Sciex, Ltd, Toronto, CA; Hager, Rapid Communications in Mass Spectrometry, 2002, 16, 512-526), was used to replace the RIT-1 of the stretched geometry (FIG. 33C-D). The QLIT was constructed with round electrodes (r=4.17) and has a symmetric configuration with r0=4.0 mm. Simulations were carried out for the comparison of the electric fields for the RIT-RIT and the QLIT-RIT configurations (FIGS. 35A-E). The narrowest KE distribution was expected for the QLIT operated with a balanced, double phase RF. The mass selective transfer of the intact precursor ions were indeed achieved for the QLIT-RIT configuration with the AC excitation with no need for elevated pressure. As shown in FIG. 36 panels A-F and FIG. 37 panels A-F for analysis of a mixture of clenbuterol (1 μg/mL), amitriptyline-d6 (1 μg/mL), amitraz (200 ng/mL), cysteine (500 ng/mL) and cocaine (500 ng/mL) in a methanol solution, each of the precursor ions from these compounds could be mass selectively transferred with minimal fragmentation (FIG. 37 panels A-F) and subsequently fragmented in RIT and mass analyzed (FIG. 36 panels B-F).

The ions were introduced through the DAPI for 20 ms, trapped and cooled in the LIT for 500 ms. The MS/MS analysis of the precursor ions from each compound took about 100 ms, including 30 ms for the mass-selective transfer from the QLIT to RIT, 20 ms for the fragmentation by CID, and about 50 ms for MS analysis of the fragment ions. With five MS/MS analysis executed for each scan cycle, the average analysis speed for each MS/MS analysis is 0.2 s, which is comparable with commercial instrument operated with continuous atmospheric pressure interface. The system herein had a large manifold and also a pumping system for lab scale mass spectrometer, viz. with a 30 m3/h rotary vane pump (UNO-030M, Pfeiffer Vacuum Inc., New Hampshire) and a 345 L/s turbo pump (TurboVac 361, Leybold Vacuum, Germany).10 The scan with DAPI opening could be repeatedly run at 0.6 s per scan. For miniature DAPI-RIT systems with small pumping systems (Li et al., Analytical Chemistry, 2014, 86, 2909-2916; and Gao et al., Analytical Chemistry, 2008, 80, 7198-7205) the scan period is typically 1.5 s for one MS/MS analysis. With a DAPI-LIT-LIT configuration implemented, the average time for MS/MS analysis of each of the n analytes can be estimated by Equation 1:

$$\text{Average time per } MS/MS = \frac{1.5 + 0.1 * n}{n} S. \qquad \text{Equation 1}$$

With the 10 or more MS/MS scans implemented within each analysis cycle, the analysis efficiency of a miniature instrument is comparable to or significantly higher than the current lab scale ion trap instruments.

Figure 38A:
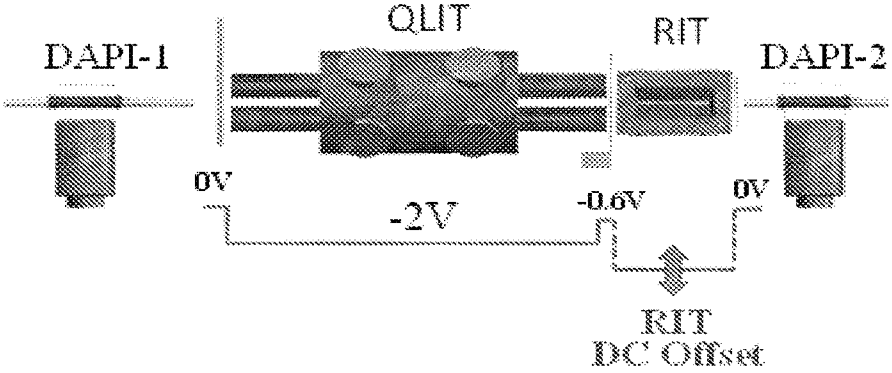
FIG. 38A shows an instrument setup for MS/MS with CID during mass selective ion transfer.
Figure 38B:
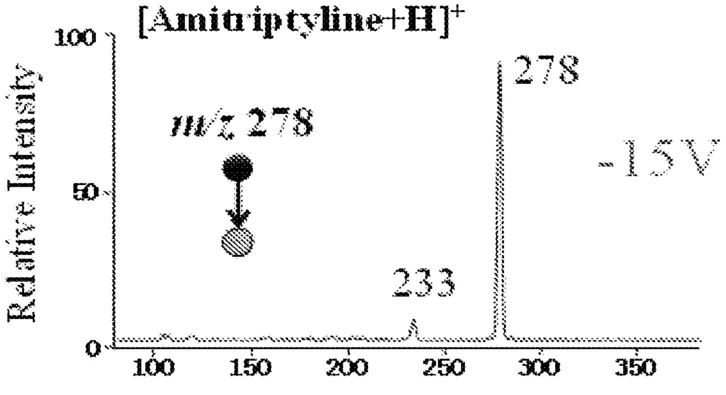
FIGS. 38B-38D show MS/MS spectra recorded for mass-selective transfer of protonated amitriptyline m/z 278 at RIT DC offset at −15V (FIG. 38B), −21V (FIG. 38C), and −40V (FIG. 38D). AC excitation for axial ejection from QLIT, 80 mV and 169 kHz, q=0.45 in QLIT; q=0.2 for trapping the ions in RIT.
Figure 38C:
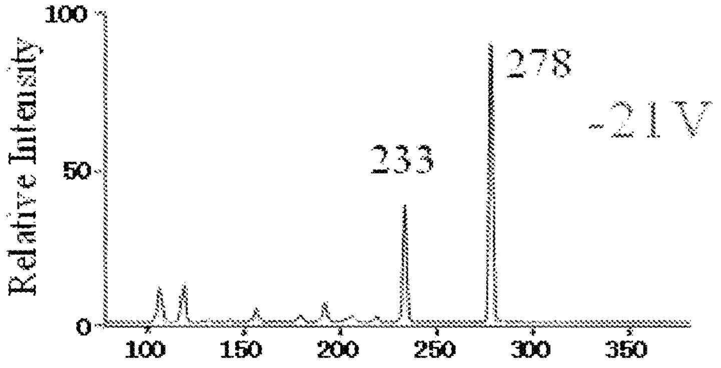
Figure 38D:
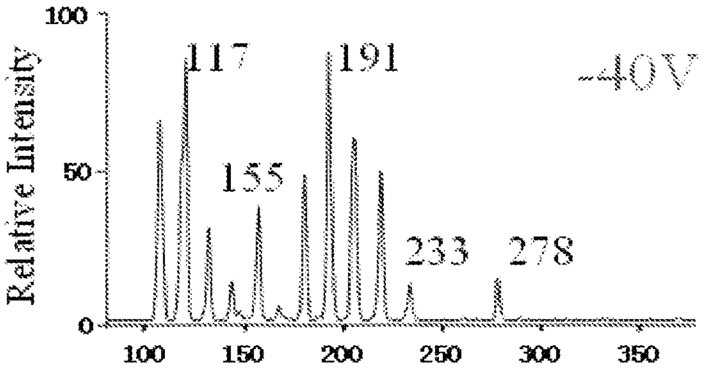

The fragmentation during mass selective transfer, as previously observed with the RIT-RIT configuration, was also explored with the QLIT-RIT in a controllable fashion. As shown in FIG. 38A, a second DAPI was used and the manifold pressure was raised to 10 rotor r with 10 ms opening immediately before the mass-selective axial transfer. As shown in FIGS. 38B-38D for the protonated amitriptyline m/z 278, the degree of fragmentation during the mass-selective transfer could be well controlled by varying the potential difference between the DC float voltages of the QLIT and the RIT.

One additional significant advantage of the multiple MS/MS analysis with a single pulse of ion introduction is the potential improvement of the precision for quantitative analysis. In the previous evaluation of the Mini 12 system of the DAPI-RIT configuration, it was shown that the stability of the signal is critical for the quantitation precision, since the MS/MS analysis of the analyte and its internal standard (IS) are performed in two completely separated scans with an interval of 1-2 s. The fluctuation of the ion current between the two ion introductions though the DAPI would result in large errors in the analyte-to-IS ratios (A/IS) measured. Using the multi-MS/MS analysis in a single scan, the analyte and IS ions can be collected at the same time and MS/MS analyzed sequentially with a time interval as short as 0.1 s.

Figure 39:
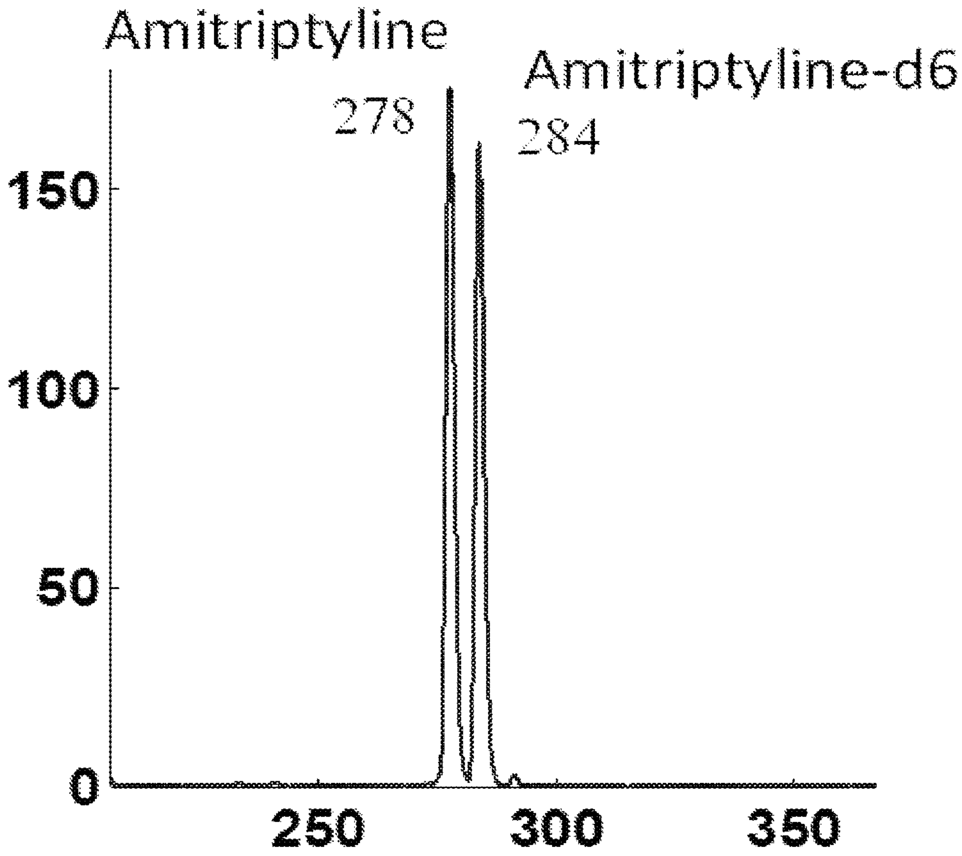
FIG. 39 shows MS spectrum recorded for protonated amitriptyline m/z 278 and amitriptyline-d6 284, which were introduced to the QLIT at the same time but sequentially mass-selectively transferred to RIT with an interval of 100 ms. The measured intensities are used to plot the trends of the varying signals in FIG. 40. Paper spray of methanol solution with amitriptyline and amitriptyline-d6 at 120 ng/mL, spray voltage of 4.3 kV. AC excitation of 80 mV 169 kHz, q=0.45, for mass-selective transfer from QLIT. q=0.2 for the trapping the ions in RIT.
Figure 40:
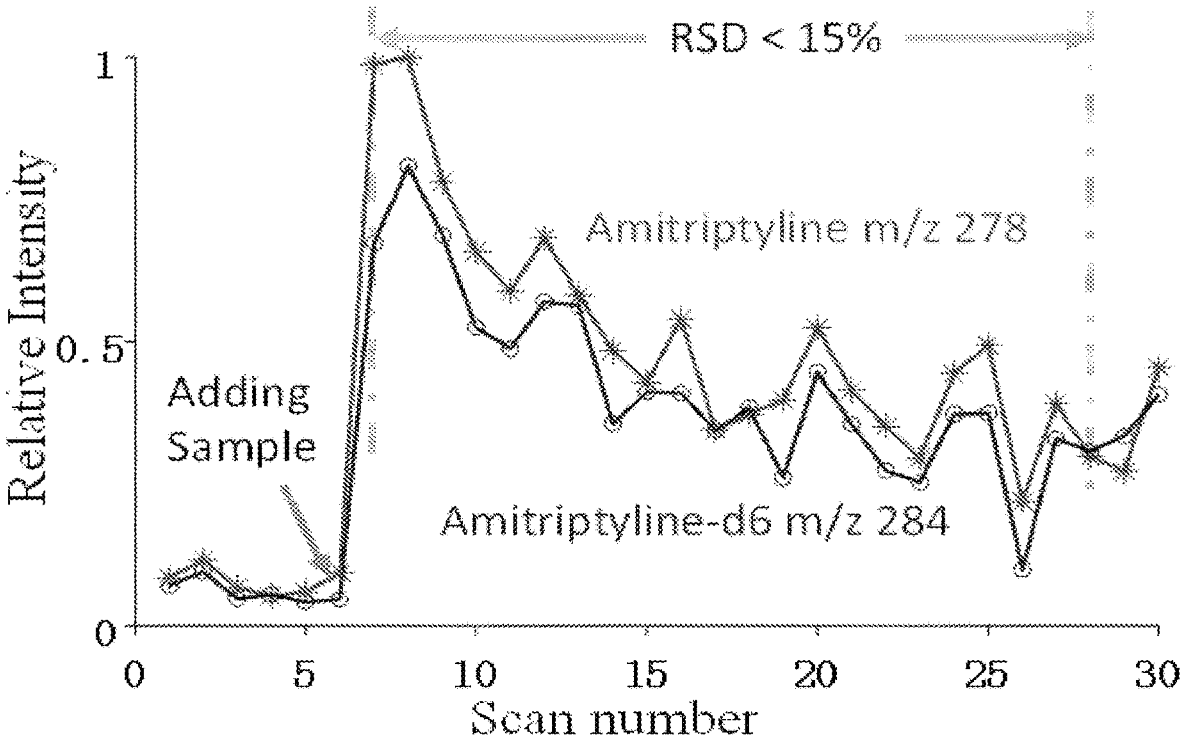
FIG. 40 shows the signal intensities measure by RIT for sequentially mass-selectively transferred amitriptyline m/z 278 and amitriptyline-d6, m/z 284. Paper spray of methanol solution with amitriptyline and amitriptyline-d6 at 120 ng/mL, spray voltage of 4.3 kV. AC excitation of 80 mV 169 kHz, q=0.45, for mass-selective transfer from QLIT. q=0.2 for the trapping the ions in RIT.

To validate this concept, 40 μL methanol solution containing amitriptyline and the IS amitriptyline-d6, each at a concentration of 120 ng/mL, were dropped on a triangle paper substrate for paper spray ionization. For each scan cycle, all the ions were first trapped in the QLIT, the protonated amitriptyline m/z 278 was first transferred to RIT and after 0.1 s the protonated amitriptyline m/z 284 was also transferred to RIT. MS analysis was then performed by the RIT and the intensities of m/z 278 and 284 were measured (FIG. 39) to calculate the A/IS ratios for each scan cycle. As shown in FIG. 40, the ion signal intensity could vary significantly with paper spray, due to the evaporation of the solvent (Li et al., Analytical Chemistry, 2014, 86, 2909-2916; and Ren et al., Chromatographia, 2013, 76, 1339-1346). However, since the analyte and IS ions were always sampled at the same time in a same opening period of DAPI, the signal intensities of the analyte and IS were well tracing each other and thereby a good precision in the A/IS ratio (RSD<15%) were obtained.

The data herein show that the dual LIT configurations described herein enable multiple MS/MS processes with a single ion introduction. That development has a direct impact on the analytical performance of the MS systems using discontinuous sample introduction interfaces, especially for miniature instruments coupled with ambient or atmospheric pressure ionization sources. The scan speed and the quantitation precision were significantly improved. Efficiency in sample consumption was highly increased, which is attractive for both miniature and lab scale MS systems performing analyses of complex mixtures. An ideal configuration for implementing this concept uses a first LIT with a large trapping capacity for overcoming the space charge effect, and a second LIT, of relatively small size but with high resolution and mass accuracy, for MS/MS analysis.

What is claimed is:

1. A method for analyzing a sample and an internal standard in a miniature mass spectrometer, the method comprising:

generating sample ions and internal standard ions;

simultaneously transferring the sample and internal standard ions through a discontinuous sample introduction interface (DAPI) into a first ion trap of the miniature mass spectrometer, wherein the first ion trap is a first rectilinear ion trap that comprises top and bottom electrodes that are y electrodes and left and right electrodes that are x electrodes;

closing the discontinuous sample introduction interface;

sequentially transferring the sample and internal standard ions to a second ion trap of the miniature mass spectrometer, wherein the second ion trap is a second rectilinear ion trap that comprises top and bottom electrodes that are y electrodes and left and right electrodes that are x electrodes and wherein the first and second ion traps share a common end mesh electrode; and sequentially analyzing within one second of each other the sample and internal standard ions in the second ion trap, wherein during a trapping step, a DC voltage is applied to the common end mesh electrode and single phase Radio Frequencies (RFs) of 1015 kHz and 995 kHz are applied on y electrodes of the first and second rectilinear ion traps, respectively, and after the trapping step and in order to then achieve an axial mass selective ejection, the ions trapped in the first rectilinear ion trap during a DAPI opening period undergo axial mass selective ejection toward the second rectilinear ion trap via application of one of the two following methods: (i) a separate RF scan with a resonance ejection by a dipolar AC, or (ii) an AC excitation with a separate steady RF.

2. The method according to claim 1, wherein generating the ions is by a technique that utilizes an ionization source that operates at atmospheric pressure and temperature.

3. The method according to claim 1, wherein generating the ions is by a technique that utilizes a direct ambient ionization/sampling technique.

4. The method according to claim 3, wherein the technique is paper spray ionization.

5. The method according to claim 1, wherein the sample and internal standard ions are transferred to the second ion trap within a single scan cycle.

6. The method according to claim 1, wherein analyzing comprises taking MS/MS measurements.

* * * * *